US 8,554,179 B2

(12) United States Patent
Pecen et al.

(10) Patent No.: US 8,554,179 B2
(45) Date of Patent: Oct. 8, 2013

(54) MANAGING MOBILE DEVICE APPLICATIONS

(75) Inventors: Mark Pecen, Waterloo (CA); Niels Peter Skov Andersen, Roskilde (DK); Shalini Suresh Periyalwar, Waterloo (CA); Matthew Campagna, Ridgefield, CT (US)

(73) Assignees: BlackBerry Limited, Waterloo, Ontario (CA); Certicom Corp., Mississauga, Ontario (CA)

( * ) Notice: Subject to any disclaimer, the term of this patent is extended or adjusted under 35 U.S.C. 154(b) by 28 days.

(21) Appl. No.: 13/242,051

(22) Filed: Sep. 23, 2011

(65) Prior Publication Data

US 2013/0078949 A1 Mar. 28, 2013

(51) Int. Cl.
*H04W 88/02* (2009.01)

(52) U.S. Cl.
USPC ........................................... 455/411

(58) Field of Classification Search
USPC ............ 455/410, 411; 701/450; 370/230, 313
See application file for complete search history.

(56) References Cited

U.S. PATENT DOCUMENTS

| 6,141,544 | A | 10/2000 | Corriveau et al. |
| 6,785,823 | B1 | 8/2004 | Abrol et al. |
| 7,069,330 | B1 | 6/2006 | McArdle et al. |
| 8,259,568 | B2 | 9/2012 | Laudermilch et al. |
| 8,275,356 | B2 | 9/2012 | Hickie |
| 8,315,198 | B2 | 11/2012 | Corneille et al. |
| 8,320,883 | B2 | 11/2012 | Watson et al. |
| 2002/0188736 | A1 | 12/2002 | Jarvensivu |
| 2004/0098715 | A1 | 5/2004 | Aghera et al. |
| 2005/0041648 | A1 | 2/2005 | Bharatia et al. |
| 2006/0141985 | A1 | 6/2006 | Patel et al. |
| 2006/0153122 | A1 | 7/2006 | Hinman et al. |
| 2007/0029380 | A1 | 2/2007 | Keohane et al. |
| 2007/0143824 | A1 | 6/2007 | Shahbazi |
| 2007/0226781 | A1 | 9/2007 | Chen et al. |
| 2008/0051076 | A1 | 2/2008 | O'Shaughnessy et al. |
| 2008/0160958 | A1 | 7/2008 | Abichandani et al. |
| 2008/0240045 | A1 | 10/2008 | Lekutai et al. |
| 2009/0042537 | A1 | 2/2009 | Gelbman et al. |
| 2009/0307105 | A1 | 12/2009 | Lemay et al. |
| 2010/0011029 | A1 | 1/2010 | Niemelae |

(Continued)

FOREIGN PATENT DOCUMENTS

WO 2005/106653 11/2005

OTHER PUBLICATIONS

3GPP TS 36.101, (3rd Generation Partnership Project; Technical Specification Group Radio Access Network; Evolved Universal Terrestrial Radio Access (E-UTRA); User Equipment (UE) radio transmission and reception); v10.4.0, Sep. 2011, 242 pages.

(Continued)

*Primary Examiner* — Diane Mizrahi
(74) *Attorney, Agent, or Firm* — Fish & Richardson P.C.

(57) ABSTRACT

Methods, systems, and computer programs for managing mobile device applications are described. In some aspects, a mobile device application is prevented from accessing resources of a wireless network. For example, a wireless network operator system can determine that one or more mobile device applications are disapproved for use in the wireless network. In some implementations, the wireless network operator denies the disapproved mobile device applications access to the wireless network resources. In some implementations, mobile devices disable access to the wireless network by the disapproved mobile device applications.

19 Claims, 7 Drawing Sheets

(56) References Cited

U.S. PATENT DOCUMENTS

| | | | |
|---|---|---|---|
| 2010/0190474 | A1 | 7/2010 | Rajguru |
| 2010/0198728 | A1 | 8/2010 | Aabye et al. |
| 2010/0234071 | A1* | 9/2010 | Shabtay et al. ............ 455/562.1 |
| 2010/0330958 | A1 | 12/2010 | Corda et al. |
| 2011/0047594 | A1 | 2/2011 | Mahaffey et al. |
| 2011/0141276 | A1* | 6/2011 | Borghei ........................ 348/143 |
| 2011/0145585 | A1 | 6/2011 | Campagna et al. |
| 2011/0197257 | A1 | 8/2011 | Maes |
| 2012/0166582 | A1 | 6/2012 | Binder |
| 2012/0253665 | A1 | 10/2012 | Forstall et al. |
| 2012/0270522 | A1 | 10/2012 | Laudermilch et al. |

OTHER PUBLICATIONS

3GPP TS 36.104, (3rd Generation Partnership Project; Technical Specification Group Radio Access Network; Evolved Universal Terrestrial Radio Access (E-UTRA); Base Station (BS) radio transmission and reception); v10.4.0, Sep. 2011, 112 pages.

3GPP TS 36.321, (3rd Generation Partnership Project; Technical Specification Group Radio Access Network; Evolved Universal Terrestrial Radio Access (E-UTRA); Medium Access Control (MAC) protocol specification); v10.3.0, Sep. 2011, 54 pages.

3GPP TS 36.322, (3rd Generation Partnership Project; Technical Specification Group Radio Access Network; Evolved Universal Terrestrial Radio Access (E-UTRA); Radio Link Control (RLC) protocol specification); v10.0.0, Dec. 2010, 39 pages.

International Search Report and Written Opinion of the Interantional Searching Authority issued in International Application No. PCT/US2012/056653 on Jan. 4, 2013; 12 pages.

Extended European Search Report issued in European Application No. 12185674.4 on Feb. 26, 2013; 7 pages.

Office Action issued in U.S. Appl. No. 13/242,016 on Jan. 24, 2013; 17 pages.

International Search Report and Written Opinion of the International Searching Authority issued in International Application No. PCT/US2012/056656 on Dec. 6, 2012; 10 pages.

International Search Report and Written Opinion of the International Searching Authority issued in International Application No. PCT/US2012/056651 on Dec. 6, 2012; 10 pages.

Extended European Search Report issued in European Application No. 12185671.0 on Dec. 6, 2012; 6 pages.

Extended European Search Report issued in European Application No. 12185669.4 on Dec. 6, 2012; 6 pages.

* cited by examiner

MANAGING MOBILE DEVICE APPLICATIONS

BACKGROUND

This specification relates to managing mobile device applications in a wireless network.

Many mobile devices have wireless communication capabilities. For example, some mobile devices can communicate with a wireless Local Area Network (WLAN), a Personal Area Network (PAN) (e.g., Bluetooth and others), or a public land mobile network using cellular technology (e.g., Global System for Mobile Communication (GSM), Universal Mobile Telecommunication Services (UMTS), Long-Term Evolution (LTE), etc.). Some mobile devices execute applications that utilize the wireless communication capabilities of the mobile device, for example, to communicate with external systems or devices.

BRIEF DESCRIPTION OF THE DRAWINGS

Like reference numbers and designations in the various drawings indicate like elements.

DETAILED DESCRIPTION

Figure 1:
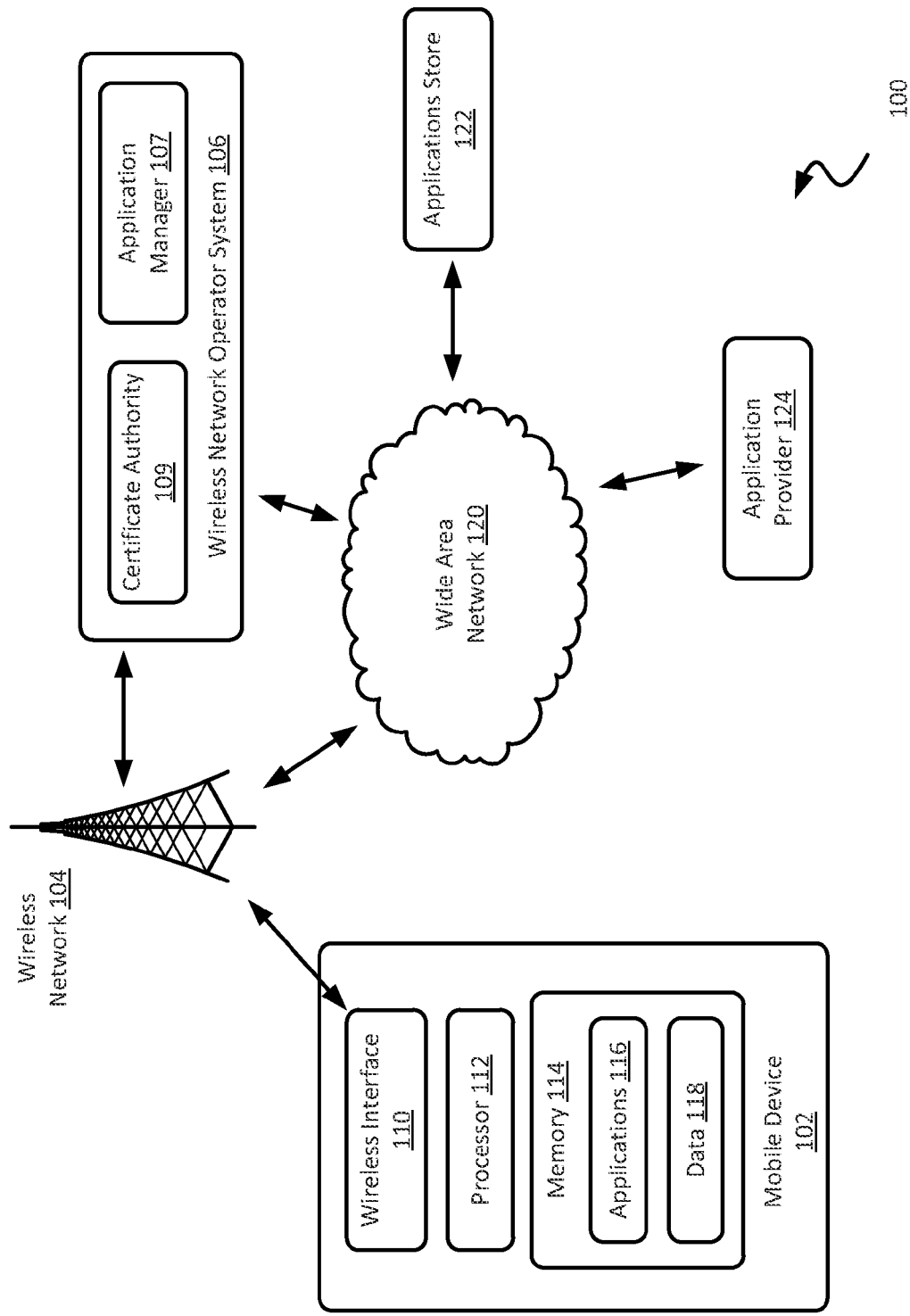
FIG. 1 is a schematic diagram of an example communication system.

A wireless network system can proactively control the operation of rogue mobile device applications that are configured to access the wireless network. In some aspects, the wireless network can assign each mobile device application a unique identity, authenticate mobile device applications that require access to the wireless network, and identify "rogue" mobile device applications that are to be denied use of the wireless network. Having identified a rogue mobile device application, the wireless network can block or disable the mobile device application to prevent the mobile device application from consuming resources of the wireless network. For example, the wireless network can deny a request for network resources if the request was initiated by the disapproved mobile device application. As another example, the wireless network may instruct the mobile user equipment to disable the disapproved mobile device application and inform the user of the reason. As another example, the wireless network may instruct an applications store to restrict or terminate distribution of the disapproved mobile device application.

When mobile device applications are capable of autonomous access to data over a wireless network, mobile device applications can exhibit rogue behavior, which may in turn have undesirable impacts on the ability of the network to function normally. For example, a mobile device application may fall into an unintended programming loop that issues hundreds or thousands of requests for data over a cellular network over a short time period, which can create a denial of service attack (e.g., by eventually running the network out of signaling resources, such as random access channels). Further, wireless networks may want to suppress certain mobile device applications in various circumstances, for example, for the period during which the wireless terminal is roaming in the network, to avoid repeated attempts by the application to access the network, or in other circumstances.

A wireless network operator can maintain a database of information for mobile device applications. The database can indicate, in some cases, that certain mobile device applications are disapproved. Additionally or alternatively, the database can indicate, in some cases, that certain mobile device applications are approved. Generally, a disapproved mobile device application can include any type of application or program that has been identified for restricted access or no access to the wireless network. As such, disapproved mobile device applications can include mobile device applications that were previously approved, mobile device applications that were not previously approved, or any appropriate combination of these and other categories of mobile device applications. In some cases, disapproved mobile device applications include mobile device applications that have been disapproved, disallowed, banned, disqualified, or otherwise identified for permanently or temporarily restricted access to the wireless network.

Generally, a variety of techniques can be used to prevent disapproved mobile device applications from accessing wireless network resources without interrupting the operation of other mobile device applications. For example, if a disapproved mobile device application has been installed on a wireless terminal, the disapproved mobile device application can be prevented from accessing wireless network resources, and other mobile device applications installed on the wireless terminal can be permitted to access the wireless network resources. A mobile device application can be prevented from accessing wireless network resources by actions taken by a wireless network operator, actions taken by wireless terminals using the wireless network, actions taken by an applications store, or by additional or different entities.

In some implementations, the wireless network operator takes actions that prevent disapproved mobile device applications from accessing wireless network resources. For example, the wireless network operator can deny mobile device applications access to wireless network resources. In some instances, the wireless network operator can deny a mobile device application access to wireless network resources when the mobile device application initiates a request for the wireless network resources (e.g., when the mobile device application initiates a radio resource request on a random access channel). In some instances, the wireless network operator can deny a mobile device application access to wireless network resources when the mobile device application has been installed or executed on a wireless terminal operating in the wireless network. For example, the wireless network operator can send the wireless terminal instructions to disable the mobile device application. The wireless network operator can perform additional or different operations to prevent a mobile device application from accessing wireless network resources.

In some implementations, wireless terminals take actions that prevent disapproved mobile device applications from accessing wireless network resources. For example, the wireless terminal can disable access to wireless network resources by disapproved mobile device applications installed on the wireless terminal. In some instances, the wireless terminal can disable a mobile device application's access to wireless network resources after the wireless network has denied a request initiated by the mobile device application (e.g., when the wireless network denies a radio resource request initiated by the mobile device application). In some instances, the wireless terminal can disable a mobile device application's access to wireless network resources when the wireless terminal receives instructions to disable a list of disapproved mobile device applications. Wireless terminals can perform additional or different operations to prevent a mobile device application from accessing wireless network resources.

FIG. 1 is a schematic diagram of an example communication system 100. The example communication system 100 includes a mobile device 102, a wireless network system 103, a wide area network 120, an applications store 122, and an applications provider 124. The communication system 100 can include additional or different features and components. For example, the communication system 100 can include one or more servers, computing systems, additional or different networks, wireless terminals, or any suitable combination of these other components. The wireless network system 103 includes one or more wireless networks 104 and a wireless network operator system 106. The wireless network system 103 can include additional or different features and components. The components of the communication system 100 can be configured as shown in FIG. 1, or the communication system 100 can be configured in another manner, as appropriate.

The example wireless network 104 shown in FIG. 1 can include one or more wireless telecommunication networks, wireless data networks, combined voice and data networks, or any suitable combination of these and other types of wireless networks. The wireless network 104 can be a public land mobile network that uses cellular technology (e.g., Global System for Mobile Communication (GSM), Universal Mobile Telecommunication Services (UMTS), Long-Term Evolution (LTE), etc.). The wireless network 104 can communicate with the mobile device 102, for example, by radio frequency signals or another mode of communication. The wireless network 104 can include one or more local, regional, national, and/or global networks. The wireless network 104 can include one or more cellular networks. For example, a cellular network can include one or more base stations, radio antennas, and other subsystems and infrastructure. The wireless network 104 may utilize one or more communication protocol standards, for example, 3G, 4G, GSM, LTE, CDMA, GPRS, EDGE, LTE, or others.

In the example shown in FIG. 1, the mobile device 102 can communicate with the wireless network system 103. In some instances, the wireless network 104 can provide the mobile device 102 access to the wide area network 120. As such, in some instances, the mobile device 102 can communicate with other devices or subsystems over the wide area network 120 using access provided by the wireless network 104. The mobile device 102 may communicate over additional or different types of networks and may have other ways of accessing the wide area network 120. Generally, mobile devices can be configured to communicate over wireless Local Area Networks (WLANs), Personal Area Network (PANs) (e.g., Bluetooth and other short-range communication systems), metropolitan area networks, public land mobile networks using cellular technology (e.g., Global System for Mobile Communication (GSM), Universal Mobile Telecommunication Services (UMTS), Long-Term Evolution (LTE), etc.), and other types of wireless networks.

In the example shown in FIG. 1, wireless network 104, the wireless network operator system 106, the applications store 122, and the application provider 124 can communicate over the wide area network 120, and possibly additional or different types of networks. The wide area network 120 can include any suitable data network. The wide area network 120 can include a public network such as the Internet, a virtual private network (VPN), an enterprise network, or another type of data network. The wide area network 120 can include devices, systems, or networks residing in a local, regional, multi-regional, or global area.

Figure 2:
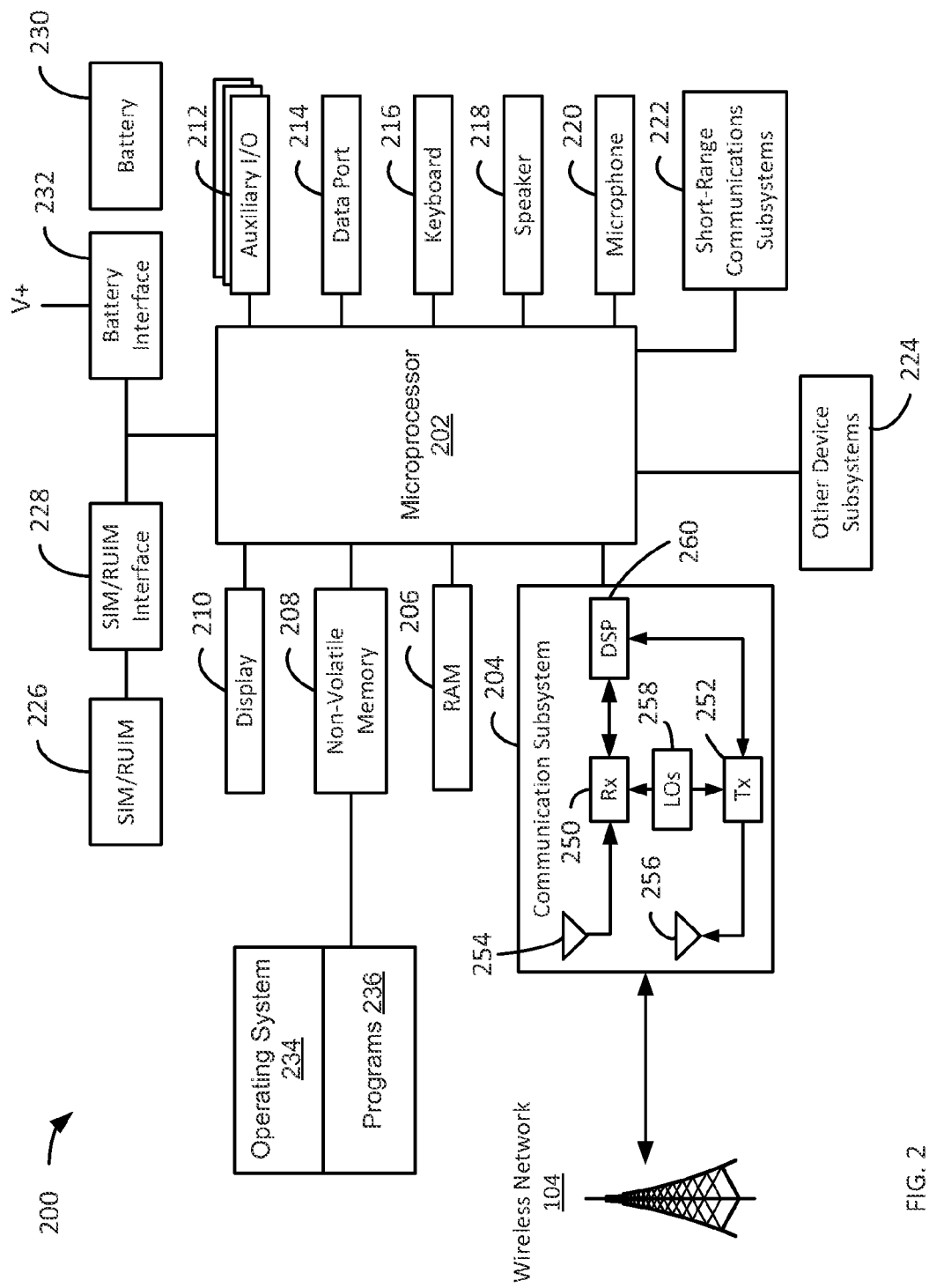
FIG. 2 is a schematic diagram of an example wireless terminal.

The mobile device 102 includes a wireless interface 110, a processor 112, and a memory 114. The memory 114 includes applications 116 and data 118. The mobile device 102 can include additional or different features. In some instances, the mobile device 102 may include one or more user interfaces. For example, the user interface can include a touchscreen, a keyboard, a microphone, a pointing device (e.g., a mouse, a trackball, a stylus, etc.), or another type of user interface. Moreover, the features and components of the mobile device 102 can be configured as shown and described with respect to FIG. 1 or in a different manner. Generally, the mobile device 102 can include any appropriate types of subsystems, modules, devices, components, and combinations thereof. Examples of mobile devices include various types of mobile telecommunication devices, electronic readers, media players, smartphones, laptop systems, tablet devices, etc. The wireless terminal 200 shown in FIG. 2 is an example of a mobile device.

The wireless interface 110 of the mobile device 102 can include any suitable hardware, software, firmware, or combinations thereof. In some implementations, the wireless interface 110 can be included in a wireless communication subsystem of the mobile device 102 (such as, for example, the communication subsystem 204 of the wireless terminal 200 shown in FIG. 2). The wireless interface 110 may include additional or different features or components. In some implementations, the wireless interface 110 may include or have access to programs, codes, scripts, functions, or other types of instructions that can be executed by data processing apparatus. In some implementations, the wireless interface 110 may include or have access to pre-programmed or re-programmable logic circuits, logic gates, or other types of hardware or firmware components. The wireless interface 110 handles wireless communications between the mobile device 102 and the wireless network 104.

The processor 112 can execute instructions, for example, to generate output data based on data inputs. The instructions can include programs, codes, scripts or other types of data stored in memory. Additionally or alternatively, the instructions can be encoded as pre-programmed or re-programmable logic circuits, logic gates, or other types of hardware or firmware components. In some instances, the processor 112 can generate output data by executing or interpreting software, scripts, programs, functions, executables, or other modules stored in the memory 114. The processor 112 may perform one or more of the operations shown in FIG. 3, 4, 5, 6, or 7, as appropriate.

The memory 114 can include any suitable computer-readable media. The memory 114 can include a volatile memory device, a non-volatile memory device, or both. The memory 114 can include one or more read-only memory devices, random-access memory devices, buffer memory devices, or a combination of these and other types of memory devices. In some instances, one or more components of the memory can be integrated or otherwise associated with another component of the mobile device 102.

The applications 116 stored on the memory 114 can include instructions (e.g., computer code) associated with an operating system, computer applications, virtual machines, and/or other resources. The data stored on the memory 114 can include application data and data objects that can be interpreted by one or more of the applications. In some implementations, the memory 114 can store or access additional or different types of information, as appropriate.

The applications 116 can include one or more mobile device applications. Some mobile device applications are stand-alone, and require no interactivity with the mobile communication domain. Some mobile device applications may passively make use of certain information received, or derived, from the mobile wireless communication network. For example, a mobile device application may derive location by metrics of wireless systems Received Signal Strength (RSSI), Bit Error Rate (BER), or the like. Some mobile device applications may interact with remote service entities by communications exchanged over the wireless network 104. For example, some mobile device applications are configured to retrieve data stored on a remote system, or to provide interactivity with remote devices. In some instances, the applications 116 can include, for example: an e-mail client application configured to communicate with a remote mail server, a web browser application or internet application configured to communicate with remote web servers, games configured to communicate with other user devices, enterprise applications configured to communicate with enterprise servers, calendar applications configured to synchronize with other devices or systems, to name just a few.

In some implementations, the mobile device 102 includes an application management module that manages network access by the applications 116. For example, the application management module can be configured to prevent particular mobile device applications from establishing a communication channel on the wireless network 104; the application management module can be configured to allow particular mobile device applications to establishing a communication channel on the wireless network 104. In some cases, the application management module can be implemented as a software module in the application layer, the presentation layer, or another protocol layer of the mobile device 102. Aspects of the application manager module can be implemented in any suitable type of software, hardware, or firmware configuration.

In the example shown in FIG. 1, the wireless network operator system 106 includes an application manager 107 and a certificate authority 109. The wireless network operator system 106 can include additional or different features, components, or subsystems, and may include multiple application managers or multiple certificate authorities. The application manager 107 and the certificate authority 109, and possibly additional features of the wireless network operator system 106 can be implemented on one or more computing systems. For example, the wireless network operator system 106 can include one or more servers or server clusters, and other appropriate subsystems.

The application manager 107 can manage the allocation of wireless network resources to mobile device applications. For example, the application manager 107 can prevent particular mobile device applications from establishing a communication channel on the wireless network and permit other mobile device applications to establish a communication channel on the wireless network. In some cases, the application manager 107 determines that particular mobile device applications are disapproved for use in the wireless network 104. For example, the application manager 107 may evaluate, test, or monitor mobile device applications and either approve them or disapprove them for use in the wireless network 104 based on their expected or actual performance or based on other factors.

The application manager 107 can handle correspondence with wireless terminals. For example, the application manager 107 can send messages to and receive messages from the mobile device 102 by communication over the wireless network 104. In some implementations, the application manager 107 receives requests for network resources from mobile device applications running on wireless terminals. In some implementations, the application manager 107 can distribute a list of disapproved mobile device applications to wireless terminals. The list can be distributed with a control message instructing the wireless terminals to disable the disapproved mobile device applications. In some implementations, the wireless terminals receiving the information can send an authenticate request to the application manager 107, and the application manager 107 can generate and send an appropriate response that allows the wireless terminals to authenticate the application manager 107.

The certificate authority 109 can issue cryptographic certificates for devices, users, applications, or other entities. Generally, a cryptographic certificate certifies a particular public key associated with an entity, and may also certify that the entity has possession of a private key corresponding to the certified public key. In some examples, the applications manager 107, the applications store 122, or another entity obtains a cryptographic certificate for each mobile device application. In some cases, the cryptographic certificate can be used to sign the mobile device application so that integrity of the mobile device application can be verified by the mobile device 102 when it is downloaded. In some cases, the cryptographic certificate can be used by the mobile device 102 to provide authentication for messages or devices. The cryptographic certificates can include implicit certificates, explicit certificates, or other types of digital certificates. Examples of conventional cryptographic certificates include X.509 certificates, Elliptic Curve Qu Vanstone (ECQV) implicit certificates, and others. The certificate authority 109 can act as a root certificate authority, a subordinate certificate authority, or another type of certificate authority.

The applications store 122 makes mobile device applications available to be downloaded and executed by mobile devices, including the mobile device 102. The applications store 122 can include any appropriate devices or subsystems. For example, aspects of the applications store 122 can be implemented on one or more servers or server clusters, or another type of computing system. In some implementations, users have accounts with the applications store 122, and users log into the applications store using user credentials. Mobile device applications can be downloaded from the applications store 122 to the mobile devices over the wide area network 120, the wireless network 104, or any suitable combination of these and another types of communication links. Mobile device applications can be downloaded to the mobile device 102 during use of the mobile device 102, during provisioning of the mobile device 102, during manufacturing of the mobile device 102, or at other times. The applications store 122 can provide updates and other relevant data relating to mobile device applications.

In some implementations, the applications store 122 assigns a unique application identifier to each mobile device application. Additionally or alternatively, the certificate authority 109 or another component of the wireless network operator system 106 can assign unique application identifiers to each mobile device application. The application identifiers can be used to manage the use of wireless network resources by mobile device applications. For example, the application manager 107 can maintain a list of application identifiers for particular mobile device applications that are approved or disapproved for access to the wireless network 104. The application manager 107 can prevent the disapproved mobile device applications from establishing a communication channel on the wireless network. For example, radio resource requests initiated by a disapproved mobile device application can be denied by the wireless network operator system 106, or the disapproved mobile device applications can be disabled on the mobile device 102.

The application identifier can be distinct for each version, release, or other variation of a mobile device application. The application identifiers can be assigned to mobile device applications randomly, or they can be systematically created for each mobile device application, for example, according to a scheme. In some cases, the application identifier can be a combination of alphanumeric characters, a binary value, or another type of identifier.

The application provider 124 designs, configures, or otherwise generates mobile device applications that can be installed on mobile devices. The application provider 124 can include a software developer, an individual, an enterprise, or any other type of entity that creates mobile device applications. The application provider 124 can provide mobile device applications or updates for mobile device applications to the applications store 122, and the applications store 122 can make the mobile device applications or updates generally available to wireless terminals. In some implementations, wireless terminals can access mobile device applications from an application provider 124 other than through the applications store 122. For example, the mobile device 102 can receive a mobile device application from the application provider 124 over the Internet, at a store location, or in another manner.

In one aspect of operation, the applications store 122 receives a mobile device application from the application provider 124. The applications store 122, the certificate authority 109 or another entity generates an application identifier for the mobile device application. The certificate authority 109 generates a cryptographic certificate for the mobile device application. The applications store 122, the certificate authority 109 or another entity signs the mobile device application using the private data associated with the cryptographic certificate. The application manager 107 evaluates the mobile device application and either approves or disapproves the mobile device application. If the mobile device application is disapproved, the applications store 122 is notified and may be instructed not to distribute the mobile device application for use in the wireless network 104. If the mobile device application is approved, the mobile device 102 can download and install an instance of the mobile device application. The mobile device 102 can use the cryptographic certificate to verify integrity of the mobile device application based on the digital signature. The mobile device 102 can extract the application identifier for the mobile device application, for example, upon execution of the mobile device application at the mobile device 102.

In another aspect of operation, the application manager 107 determines that a mobile device application is disapproved. For example, the application manager 107 may determine that the mobile device application is a rogue application, or may determine that the mobile device application should be disallowed for additional or different reasons. The application manager 107 can prevent the disapproved mobile device application from consuming resources of the wireless network 104. For example, the mobile device 102 can be configured to include an application identifier in all requests for assignments of network resources, and the application manager 107 can monitor the requests. When the application manager 107 identifies a request initiated by a disapproved mobile device application, the application manager 107 can take action to deny the request. As another example, application manager 107 can distribute a control message that instructs the mobile device 102 to disable any of the disapproved mobile device applications. The mobile device 102 can authenticate the application manager 107, for example, to ensure that the control message is legitimate. The application manager 107 can be authenticated based on the cryptographic certificate associated with the disapproved mobile device application.

FIG. 2 is a schematic diagram of an example wireless terminal 200. For example, the wireless terminal 200 can be a BLACKBERRY® telecommunication device and/or another type of mobile telecommunication device. In some implementations, the wireless terminal 200 is a dual-mode device. The example wireless terminal 200 in FIG. 2 includes a microprocessor 202, a communication subsystem 204, random access memory (RAM) 206, non-volatile memory 208, a display 210, one or more auxiliary input/output (I/O) devices 212, a data port 214, a keyboard 216, a speaker 218, a microphone 220, a short-range communication subsystem 222, other device subsystems 224, a SIM/RUIM card (i.e., a Subscriber Identity Module or a Removable User Identity Module) 226, a SIM/RUIM interface 228, a rechargeable battery 230, a battery interface 232, and possibly other components. The wireless terminal 200 can include the same, additional, or different features, which may be arranged or configured to operate in the manner shown or in a different manner.

The example wireless terminal 200 is a battery-powered device that includes a battery interface 232 that receives direct current electrical power from one or more rechargeable batteries 230. The battery 230 can be a smart battery with an embedded microprocessor or a different type of battery. The battery interface 232 may be coupled to a regulator (not shown), which may assist the battery 230 in providing power V+ to the wireless terminal 200. Additionally or alternatively, the wireless terminal 200 may receive power from an external source (e.g., an alternating current power source, an adapter, a converter, etc.) and/or a different type of internal power source.

The example wireless terminal 200 shown in FIG. 2 can operate as a two-way communication device having voice and data communication capabilities. The wireless terminal 200 can communicate over a wireless network. For example, the wireless terminal 200 may communicate over the wireless network 104 shown in FIG. 1, or different or different types of wireless networks. Thus, the wireless terminal 200 may communicate over a voice network, such as any of the analog or digital cellular networks, and may also communicate over a data network. Voice and data networks may be implemented as separate communication networks using separate infrastructure, such as base stations, network controllers, etc., or the voice and data networks may be integrated into a single wireless network. In some implementations, the wireless network utilize one or more communication protocol standards, for example, 3G, 4G, GSM, CDMA, GPRS, EDGE, LTE or others.

In the example wireless terminal 200 shown in FIG. 2, the communication subsystem 204 includes a receiver 250, a transmitter 252, antennae 254 and 256, one or more local oscillators 258, a digital signal processor (DSP) 260 and possibly other features. The antennae 254 and 256 may include antenna elements of a multiple-element antenna, embedded antennae, radio frequency (RF) antennae, and/or other types of antennae. The communication subsystem 204 can be used to communicate with a network. The DSP 260 can be used to receive and send signals through the receiver 250 and the transmitter 252, respectively, and the DSP 260 can provide control information to the receiver 250 and the transmitter 252. For example, the gain levels applied to communication signals in the receiver 250 and the transmitter 252 can be adaptively controlled through automatic gain control algorithms implemented in the DSP 260. Additional and/or different types of control algorithms may be implemented in the DSP 260 to provide more sophisticated control of the communication subsystem 204.

In some implementations, the local oscillator 258 includes a single local oscillator that provides a reference signal for the receiver 250 and the transmitter 252, for example, where voice and data communications occur at a single frequency, or closely-spaced sets of frequencies. In some cases, for example if different frequencies are utilized for voice communications and data communications, the local oscillator 258 may include multiple local oscillators that are used to generate multiple different frequencies corresponding to the voice and data networks. Information, which may include both digital voice and digital data information, can be communicated within the wireless terminal 200 to and from the communication subsystem 204 through a link or bus between the DSP 260 and the microprocessor 202. The design and configuration of the communication subsystem 204, such as frequency band, component selection, power level, etc., may depend on the communication network in which the wireless terminal 200 is intended to operate. For example the communication subsystem 204 may be configured for 2G, 2.5G, 3G, 4G, and other voice and data networks, such as GSM, CDMA2000, GPRS, EDGE, W-CDMA (UMTS), FOMA, EV-DO, TD-SCDMA, HSPA, HSOPA, and the like.

After any required network registration or activation procedures have been completed, the wireless terminal 200 may send and receive communication signals, including both voice and data signals, over the wireless network 104. Signals received by the antenna 254 from the communication network can be routed to the receiver 250, which can provide signal amplification, frequency down conversion, filtering, channel selection, etc., and may also provide analog to digital signal conversion. Analog to digital conversion of the received signal may allow the resulting digital signal to be decoded by the DSP 260. Signals to be transmitted to the network can be processed (e.g., modulated, encoded, etc.) by the DSP 260 and then provided to the transmitter 252 for digital to analog conversion, frequency up conversion, filtering, amplification and transmission to the communication network via the antenna 256.

In some implementations, the wireless terminal 200 can send and receive communication signals over the wireless network 104 after wireless network registration or activation procedures have been completed. The wireless network registration or activation procedures for the wireless terminal 200 may vary based on the type of network or networks with which the wireless terminal 200 operates. Wireless network access for the example wireless terminal 200 shown in FIG. 2 can be associated with a subscriber or user of the wireless terminal 200. In particular, the SIM/RUIM card 226 in the SIM/RUIM interface 228 may identify the subscriber or user of the wireless terminal 200. The SIM/RUIM card 226 in the SIM/RUIM interface 228 may enable access to subscribed services through the wireless network 104. For example, subscribed services may include web browsing, e-mail, voice mail, Short Message Service (SMS), Multimedia Messaging Services (MMS), and/or others. The SIM/RUIM card 226 in the SIM/RUIM interface 228 can communicate with the microprocessor 202 on the wireless terminal 200. To identify the subscriber, the SIM/RUIM card 226 may include user parameters, such as an International Mobile Subscriber Identity (IMSI) and/or another type of subscriber identifier. The SIM/RUIM card 226 may store additional and/or different subscriber information, including calendar information, call log information, contacts information, and/or other types of information. Additionally or alternatively, user identification information can also be stored in the non-volatile memory 208.

The data port 214 may include a serial port, a parallel port, and/or another type of connection port. In some implementations, the data port 214 is a Universal Serial Bus (USB) port that includes data lines for data transfer and a supply line that can provide a charging current to charge the battery 230 of the wireless terminal 200. The wireless terminal 200 may be manually synchronized with a host system, for example, by connecting the wireless terminal 200 through the data port 214 (e.g., in an interface cradle and/or another type of wired connection) that couples the wireless terminal 200 to a data port of a computer system or other device. The data port 214 may also be used to enable a user to set preferences through an external device or software application, or to download other programs for installation. The wired connection of the data port 214 may be used to load an encryption key onto the device.

The short-range communications subsystem 222 can provide communication between the wireless terminal 200 and different systems or devices, without the use of the wireless network 104. For example, the short-range communications subsystem 222 can include any suitable radio frequency devices and associated circuits and components for short-range communication. The wireless terminal 200 can a Bluetooth subsystem, an NFC subsystem, an infrared communication subsystem, a WiFi communication subsystem, another type of short-range communication subsystem, or any suitable combination. In some implementations, the short-range communication subsystem 222 can be configured according to one or more standards or other types of specifications. Examples of short-range communication standards include standards developed by the Infrared Data Association (IrDA), BLUETOOTH®, the 802.11 family of standards developed by IEEE, the NFC Forum, and others.

The example microprocessor 202 can manage and control the overall operation of the wireless terminal 200. Many types of microprocessors or microcontrollers may be used, as appropriate. Additionally or alternatively, a single DSP 260 may be used to carry out one or more functions of the microprocessor 202. Low-level communication functions, including data and voice communications, may be performed through the DSP 260 in the communication subsystem 204. High-level communication applications, such as voice communication applications, data communication applications, and/or other types of software applications may be stored in the non-volatile memory 208 for execution by the microprocessor 202. The microprocessor 202 can interact with other device subsystems, such as the display 210, the RAM 206, the auxiliary input/output (I/O) devices 212, the data port 214, the keyboard 216, the speaker 218, the microphone 220, the SIM/RUIM interface 228, the battery interface 232, the short-range communication subsystem 222, and any other device subsystems generally designated as 224.

The non-volatile memory 208 includes erasable persistent storage, for example, flash memory, battery-backed-up RAM, and/or other types of memory. In the example shown in FIG. 2, the non-volatile memory 208 stores instructions and data associated with an operating system 234, programs 236 that provide various types of functionality for the wireless terminal 200, and other types of information. The non-volatile memory 208 may include a file system to facilitate storage of data items on the device. For example, the operating system 234, the programs 236, and/or other modules executed on the microprocessor 202 may store, retrieve, modify, delete, and/or otherwise manipulate data by accessing (e.g., read, write, etc.) the file system provided on the non-volatile memory 208.

Data stored in the non-volatile memory 208 and/or other computer-readable media on the wireless terminal 200 may include user application data, text files, image files, voicemail data, and other data generated by the user at the wireless terminal 200 or received and stored by the wireless terminal 200. The user application data may include, for example, e-mail message data, address book data, contact information data, calendar appointment data, instant message data, SMS message data, voicemail data, user-entered data, and/or other types of application data. Voicemail data may include digitized audio recordings and/or stub entries available for viewing in a messaging application indicating the availability of a voicemail message stored at another location. User-entered data may include text-based, graphic, or other multimedia files loaded onto the wireless terminal 200 by the user.

The operating system 234 can control low-level functions of the wireless terminal 200 and facilitate operation of the programs 236. For example, the operating system 234 may provide an interface between one or more of the programs 236 and one or more hardware components on the wireless terminal 200. The programs 236 include computer program modules that can be executed by the microprocessor 202 (and/or the DSP 260 in some instances). In some implementations, one or more of the programs 236 are executed by the microprocessor 202 and provide a high-level interface between a user and the wireless terminal 200. The user interface provided by a program 236 typically includes a graphical component provided through the display 210, and may additionally include an input/output component provided through the auxiliary I/O devices 212, the keyboard 216, the speaker 218, and/or the microphone 220. The operating system 234, specific device applications or programs 236, or parts thereof, may be temporarily loaded into a volatile store, such as RAM 206, for faster operation. Moreover, received communication signals may also be temporarily stored to RAM 206 before they are permanently written to a file system in the non-volatile memory 208.

The programs 236 stored in the non-volatile memory 208 may include, for example, a message application, a calendar application, one or more third party applications, and other types of mobile device applications. The programs 236 may include additional or different modules, programs, or applications, such as, for example, a Personal Information Manager (PIM) module, a connect module, a device state module, an IT policy module, a multi service platform manager, and/or others. The programs 236 may include programs that control basic device operations, which may be installed on the wireless terminal 200 during its manufacture and/or initial configuration. Other types of software applications, such as, for example, third party applications and/or other types of modules, may be added after the manufacture and initial configuration of the wireless terminal 200. Examples of third party applications include games, utilities, internet applications, etc. Generally, any of the programs 236 may be updated and/or modified at any time. The additional applications and/or updates to applications can be loaded onto the wireless terminal 200 through the wireless network 104, the auxiliary I/O devices 212, the data port 214, the short-range communication subsystem 222, or any other suitable device subsystem 224. The non-volatile memory 208 may also store keys, which may include encryption and decryption keys and addressing information for use in communicating between the wireless terminal 200 and servers.

Figure 3:
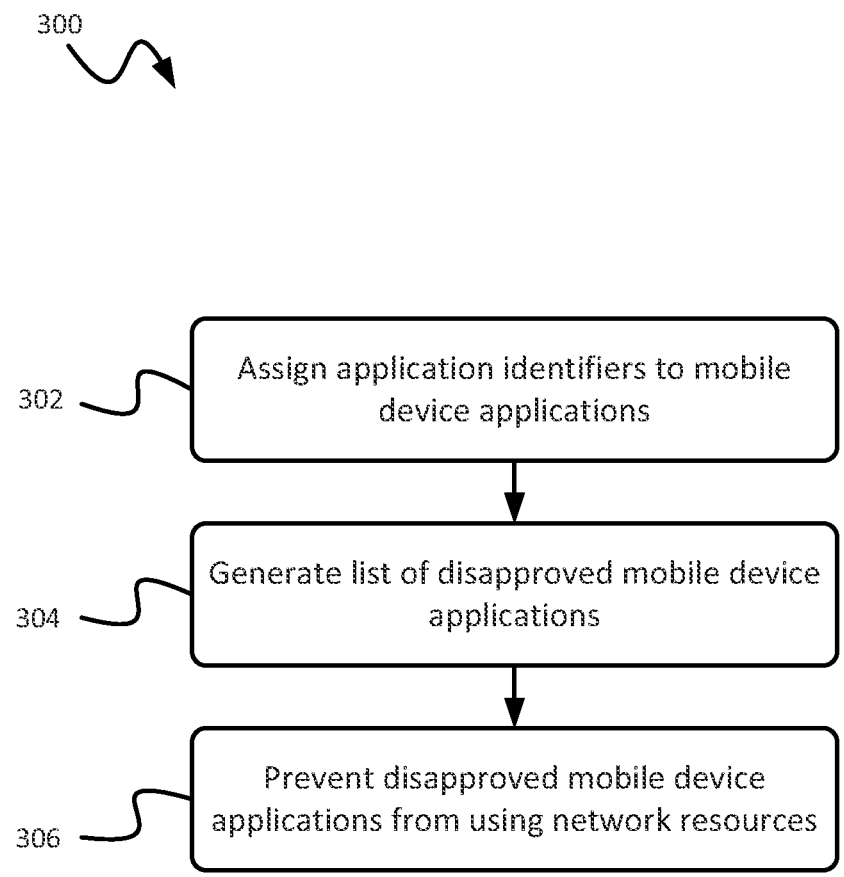
FIG. 3 is a flow diagram showing an example technique for managing mobile device applications.

FIG. 3 is a flow diagram showing an example process 300 for managing mobile device applications. The process 300 can be implemented in a communication system. For example, the process 300 can be implemented by one or more components of the communication system 100 shown in FIG. 1 or by a different type of system. In some cases, some or all aspects of the process 300 can be executed by a wireless terminal (e.g., the mobile device 102 of FIG. 1, the wireless terminal 200 of FIG. 2, etc.) or another type of wireless terminal. In some cases, some or all aspects of the process 300 can be executed by a wireless network operator system (e.g., the wireless network operator system 106 of FIG. 1, etc.) or another type of wireless network system. In some cases, the process 300 can be executed by multiple components, devices, or subsystems of the type shown in FIG. 1, 2, or 5, or components, devices, or subsystems of additional or different types.

The example process 300 shown in FIG. 3 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 3 can be executed as multiple separate operations, or one or more subsets of the operations shown in FIG. 3 can be combined and executed as a single operation.

At 302, application identifiers are assigned to mobile device applications. The application identifiers can be assigned to the mobile device applications by an applications store, by a wireless network operator, or by another entity. The application identifier can be used to manage the operation of the mobile device applications. In some implementations, a unique application identifier is assigned to each mobile device application. In some implementations, a new application identifier is assigned to each version, release, update for each mobile device application.

The application identifiers assigned to the mobile device applications can be generated based on a naming convention, based on a scheme, randomly, sequentially, or based on another technique. In some cases, an application identifier for a mobile device application can include information that indicates, or is based on, one or more of the following: a name of the mobile device application, a version number of the mobile device application, a release date of the mobile device application, a type of wireless terminal the mobile device application is configured for, a developer of the mobile device application or other information. In some cases, a wireless network operator assigns alphanumeric application identifiers and maintains a table mapping each application identifier to the name of the corresponding mobile device application.

At 304, a list of disapproved applications is generated. The list can include any suitable type of lists or data structures. In some implementations, this list can be structured as one or more databases, or the list can be generated from one or more databases. Generally, a database stores information in one or more systems. The stored data (which may include pointers to the stored data) can be stored in one or more tables in a relational database described in terms of SQL statements or scripts, or the data can be stored in a different format. The data can be formatted, stored, and/or defined as various data structures in text files, eXtensible Markup Language (XML) documents, Virtual Storage Access Method (VSAM) files, flat files, Btrieve files, comma-separated-value (CSV) files, internal variables, one or more libraries, etc.

The list can include, for example, an entry for each mobile device application. Each entry can include one or more data fields of information relating to the mobile device application. In some cases, the list includes only the application identifiers for the disapproved mobile device applications. The list may include additional or different information for each disapproved mobile device application, such as, for example, a disapproved time period, a reason the mobile device application is disapproved, a date when the mobile device application was added to the list, or other information. The list can include multiple subsets or sub-lists. For example, the list can include a sub-list of mobile device applications that are permanently disapproved, a sub-list of mobile device applications that are temporarily disapproved, or another type of subset.

At 306, the disapproved applications are prevented from using wireless network resources. In some cases, the list of disapproved mobile device applications is accessed, and the disapproved mobile device applications are prevented from establishing a communication link on the wireless network. The list can be accessed, for example, by retrieving the list from memory, by receiving the list from a remote source, by generating the list, or in any other suitable manner.

In some implementations, at 306, the list is accessed at a wireless network operator system in response to receiving a request for an assignment of wireless network resources. For example, the wireless network operator may receive a radio resource request on a random access channel (RACH). In some implementations, the request can include an application identifier for a mobile device application that initiated the request. If the application identifier corresponds to one of the disapproved mobile device applications on the list, the wireless network operator can deny the assignment of the wireless network resources. As such, the wireless network operator can prevent disapproved mobile device applications from establishing a communication link on the wireless network by comparing each request for network resources to the list of disapproved mobile device applications, and denying the requests initiated by mobile device applications on the list. The wireless network operator system can use additional or different techniques to prevent the disapproved mobile device applications from being assigned network resource. For example, an applications store can be notified that the mobile device applications are disapproved for use on the wireless network. As another example, the list of disapproved mobile device applications can be broadcast to wireless terminals within range of the wireless network, or the list of disapproved mobile device applications can be addressed to specific wireless terminals within range of the wireless network.

In some implementations, the list is accessed at a wireless terminal, and the wireless terminal prevents the disapproved mobile device applications from establishing a communication link on the wireless network. The list can include information received from a wireless network operator system, or information from another source. The wireless terminal can prevent the disapproved mobile device applications from establishing a communication link on the wireless network by disabling one or more of the wireless terminal applications at the wireless terminal. For example, a disapproved mobile device application can be disabled on a wireless terminal by disabling user access to the mobile device application, by disabling execution of the mobile device application, or in another manner. In some implementations, the wireless terminal disables a disapproved mobile device application by filtering requests for network resources generated by mobile device applications executed on the wireless terminal. For example, the wireless terminal can prevent disapproved mobile device applications from establishing a communication link on the wireless network by comparing each request for network resources to the list of disapproved mobile device applications, and terminating the requests initiated by mobile device applications on the list. The wireless terminal can use additional or different techniques to prevent the disapproved mobile device applications from being assigned network resource.

Figure 4:
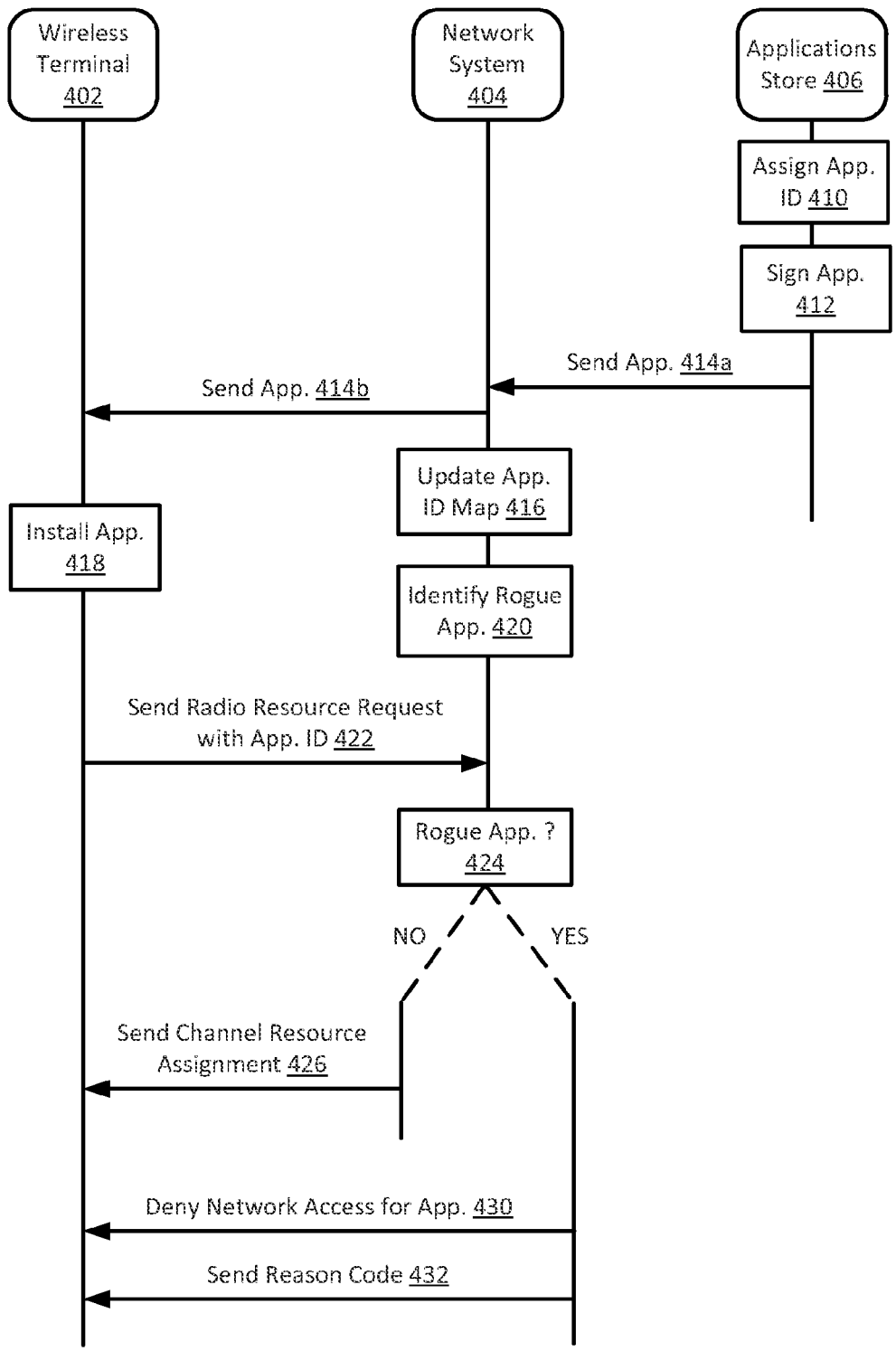
FIG. 4 is a signaling and flow diagram showing an example technique for managing mobile device applications.

FIG. 4 is a signaling and flow diagram showing an example process 400 for managing mobile device applications. The example process 400 shown in FIG. 4 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 4 can be executed as multiple separate operations, or one or more subsets of the operations shown in FIG. 4 can be combined and executed as a single operation.

The process 400 can be implemented in a communication system. For example, the process 400 can be implemented by one or more components of the communication system 100 shown in FIG. 1 or by a different type of system. FIG. 4 shows certain operations being performed by a wireless terminal 402, a wireless network operator 404, and an applications store 406. In some implementations of the process 400, one or more of the operations shown in FIG. 4 can be performed by additional or different components, devices, or subsystems, or by combinations of them, as appropriate.

In some aspects, the wireless network operator 404 can identify mobile device applications by their respective application identifiers and determine whether a mobile device application is a rogue application, or whether the mobile device application is authorized to use the wireless network. The wireless network operator 404 can block the wireless terminal 402 from accessing the wireless network for the identified rogue application. The wireless network operator 404, can notify the wireless terminal 402, the wireless network operator 404, or both, that a mobile device application has been disqualified for use on the wireless network, and that the mobile device application has been prevented from accessing the wireless network.

Aspects of the process 400 can be used to control access to a wireless network. The wireless network can be a Public Land Mobile Network (PLMN), a private wireless network, a local area network (LAN), a personal area network (PAN) or other short-range wireless network, or any other suitable wireless network. In some cases, the wireless network operator 404 can grant or deny the wireless terminal 402 access to the wireless network in an application-selective manner. For example, the wireless network operator 404 can deny the wireless terminal 402 access to the wireless network when a disapproved application on the wireless terminal 402 attempts to access the wireless network, and the wireless network operator 404 can allow wireless terminal 402 access to the wireless network when other applications on the wireless terminal 402 attempt to access the wireless network. By maintaining centralized control of network access (at the wireless network operator system), in some instances an application management solution can be more robust against attacks, workarounds, and other forms of potential abuse.

At 410, the applications store 406 assigns each mobile device application an application identifier. The application identifier can include information based on a mobile device application's name, a version number, a release number, a release date, the target equipment for which the mobile device application is configured, a level of certification by a third party (e.g., a wireless network operator, user equipment manufacturer, etc.), or other information. Each mobile device application can be associated with a unique identifier by the developer of the application, by an applications store, by a wireless network operator, or by another entity. In some instances, a central authority (e.g., a certificate authority, a code signing authority, etc.) can be configured to create and maintain the application identifier information. Additional or different systems may be used. The wireless network operator 404 may receive (e.g., periodically, upon request, or otherwise) a list of mobile device applications and their corresponding application identifiers. The wireless network operator 404 can use the list, for example, to identify and track access authority by the mobile device applications. Additionally or alternatively, the wireless network operator 404 may be given access to a look-up service to check (e.g., on a per-request basis) which mobile device application corresponds to each application identifier. For example, the look-up service can by implemented as a lightweight directory access protocol (LDAP) or another type of protocol.

At 412, the applications store signs each mobile device application. Additionally or alternatively, a cryptographic certificate can be generated for each mobile device application. For example, a public key infrastructure or another type of information security infrastructure may be used to protect against potential abuse. A mobile device application coming from an online store, manufacturer or other entity, can be signed by an entity recognized by the wireless terminal 402. An application identifier, application privileges (e.g., access to the network, access to contacts database, GPS location, etc.), or any suitable combination of these and other data can be bound to the digital signature of the code-signing authority.

At 414a and 414b, the mobile device application is transmitted to the wireless network operator 404 and to the wireless terminal 402. A mobile device application can be transmitted over the wireless network or by additional or different communication systems or links. A mobile device application can be transmitted from the applications store 406 directly to the wireless terminal 402 and directly the wireless network operator 404, or a mobile device application can be transmitted from the applications store 406 to one or more recipients through an intermediate entity or system. In some implementations, the mobile device application, the digital certificate associated with the mobile device application, the application identifier associated with the mobile device application, a digital signature associated with the mobile device application, or a combination of these and other types of information are provided to the wireless terminal 402. Such information can be provided together or in separate transmissions. Some or all of the information may be transmitted directly to the wireless terminal 402, for example, over a wired or wireless communication link. Some or all of the information may be stored on the wireless terminal 402 by a direct connection with provisioning equipment during, or after manufacture of the wireless terminal 402.

The wireless terminal 402 can authenticate the application before attempting to execute the application or at other times. For example, the wireless terminal 402 can manage a list of trusted code-signing authorities and maintain authentic copies of each trusted code-signer's public key (e.g., in a certificate-authority-signed certificate, a self-signed certificate, or otherwise). The wireless terminal 402 device can authenticate the mobile device application (e.g., upon first execution of the mobile device application, or at another time) by verifying the digital signature on the application as one issued by a trusted code-signing authority. The wireless terminal 402 can contact the code-signing authority with the application identifier of a mobile device application, and the code-signing authority can respond by sending the wireless terminal 402 an indication whether or not the application has been revoked. If the application has a valid digital signature and has not been revoked by the code-signing authority, the mobile device application may be considered authenticated in some instances.

Accordingly, the applications store 406, the network system 404, or another system or entity can act as an authentic control point for a particular mobile device application or set of mobile device applications. For example, the control point can act as its own code-signing authority. In some cases, upon receiving an application identifier from a wireless terminal 402, the control point can verify that the mobile device application is approved for the wireless network. The network operator can be designated as the only trusted code-signing authority for the wireless terminal 402, for example, if the wireless terminal 402 was provided by the wireless network, or in other cases. In some instances, mobile device applications can be signed by multiple code-signing authorities, and a negotiation between the wireless terminal 402 and the network operator can be used to agree upon an appropriate code-signing authority for operation over the wireless network. In some instances, mobile device applications are signed by the application store, and the application store can be recognized by the wireless terminal 402 as a trusted code-signing authority.

The wireless terminal 402 can use any suitable technique to verify a signature on a mobile device application. In some cases, verification of signed code utilizes a hashing process, creation of a message digest based on the application, and the public key operations of verifying the signature. For example, some signature schemes perform two basic operations during signing or verifying. First, the message is hashed using a cryptographic hash function that takes an arbitrary length message and produces a fixed digest-length hash value. Second, the hash value is used in the sign (or verify) process to produce (or confirm) a signature on the message that has the fixed digest length hash value. In some instances, the wireless terminal 402 stores (e.g., in a secure memory location) recent hashes of mobile device applications. The recent hash values can be stored in association with the application identifier for the mobile device application. As such, the stored hash values can be re-used, for example, instead of re-hashing the mobile device application to verify authenticity during the running of the application. In some implementations, the initial hash value can be generated during the initial installation of the application. The hash values can be updated opportunistically (e.g., when processing resources become available on the wireless terminal 402), rather than during the loading of the application. Updating the hash values during times of processor availability may reduce the loading time of the application. As one example, the hash values can be updated after each execution of the mobile device application, or at other times.

At 416, the wireless network operator 404 updates an application identifier map. The application identifier map can include a list of application identifiers and additional information for each mobile device application. The application identifier map can indicate, for each mobile device application, attributes of the mobile device application, whether the mobile device application is approved for use in the wireless network, network usage characteristics of the mobile device application, and additional information.

At 418, the wireless terminal 402 installs a mobile device application. The wireless terminal 402, upon receipt, installation, or execution of the mobile device application (or at other times), can approve the application based on a cryptographic certificate included with or otherwise associated with the mobile device application. The wireless terminal 402 can approve the application based on any suitable authentication technique, such as, for example, by verifying the digital signature, by executing a challenge-response protocol, or by a combination of these and other techniques. In some implementations, the wireless terminal 402 can send a challenge value and public key portion of the cryptographic certificate to the signing authority, and the signing authority can compute a response (e.g., based on the private key associated with the public key) and send the response back to the wireless terminal 402. The wireless terminal 402 can then verify that the signing authority has sent the appropriate response, and if so, approve the mobile device application for execution on the wireless terminal 402. In some implementations, the wireless terminal 402 is configured to identify unauthenticated applications and send the application identity number to the wireless network upon powering on of the wireless terminal 402.

Authentication control points can be provided by the wireless network operator 404, by the applications store 406, or by another entity. Multiple authentication control point subsystem can be provided, and each authentication control point can perform authentication for an individual mobile device application or for multiple mobile device applications. In some implementations, an authentication control point stores private data for each mobile device application. The private data can be stored in a private database or another type of secure information system or device. The private data can include, for example, a private key that corresponds to a public key certified by a cryptographic certificate. The private data can include, or can be used to generate, responses to challenges received from wireless terminals. For example, an authentication control point can include a cryptographic module that generates a digital signature or another type of response based on a private key and a challenge value.

At 420, the wireless network operator 404 identifies a mobile device application to be prevented from accessing network resources (e.g., a rogue application, or another type of application). In different contexts, mobile device applications can be identified for permanent or temporary disqualification on the wireless network based on a number of different factors.

In some aspects, wireless networks have finite bandwidth resources. For example, a wireless network typically provides a finite number of wireless channels (e.g., random access channels in an LTE system) that can be used to establish communication on the wireless network. Some mobile device applications could potentially be designed (intentionally, incidentally, or otherwise) or could potentially be capable of fraudulent or unmanaged use that impacts the performance of the wireless network. For example, such mobile device applications could potentially flood access channels with messages, and thus block or restrict other users from accessing the wireless network. More generally, mobile device applications can behave in a manner that would degrade the performance the wireless network. Such behavior can occur due to the configuration of the mobile device application, the configuration of the wireless terminal executing the mobile device application, a user's interaction with the mobile device application, or a combination of these and other factors.

In some contexts, a wireless network operator can disqualify a mobile device application from use in the wireless network at certain times or geographic regions, and thereby restrict the mobile device application's access to the wireless network. In some cases, a wireless network operator can prevent a mobile device application from using the wireless network during peak hours or in particular areas, for example, if the mobile device application consumes excessive bandwidth or has some censored content unsuitable for local or regional consumption. In such cases, another network operator can allow the use of the same mobile device application in another wireless network.

Various techniques may be used to identify rogue mobile device applications or to determine whether a particular mobile device application should be disqualified. In some instances, a mobile device application is identified for disqualification based on the expected performance of the mobile device application. For example, the wireless network operator 404 can perform a diagnostic test and determine that the mobile device application, during normal or expected usage, will consume a certain level of network resources. The wireless network operator 404 can disqualify the mobile device application based on the level of network resources the mobile device application is expected to consume during normal or expected usage. In some instances, a mobile device application is identified for disqualification based on the actual behavior of the mobile device application. For example, the wireless network operator 404 can monitor a level of network resources consumed by a mobile device application during actual usage and disqualify the mobile device application based on the actual usage of network resources. Accordingly, the wireless network operator 404 can determine thresholds for permissible network usage, and a mobile device application can be disqualified if it exceeds the thresholds. In some implementations, disqualified mobile device applications can be identified by additional or different techniques. For example, the wireless network operator 404 can receive report or a list of disqualified applications. Such reports may include input provided by operations personnel, automated monitoring systems, or a combination of these and other sources.

In some implementations, when a mobile device application is added to the applications store, the application is first evaluated and verified for performance. An application network usage map can be generated based on the evaluation. The application network usage map can include, for example, information relating to typical access requirements, average bandwidth usage, and other factors. The application network usage map can be generated, updated, or modified based on any suitable technique or process. For example, a learning and validation process can be executed during network usage at the application evaluation phase or during actual network usage by a wireless terminal. The application network usage map can be stored on the wireless network operator server (e.g., in an Operations, Administration, and Management (OA&M) subsystem, a maintenance subsystem, etc.). The wireless network operator server can, in some implementations, periodically monitor and correlate the application network usage map with the actual measured application usage. When the network usage exceeds a threshold value for the mobile device application, the mobile device application can be disqualified. Accordingly, rogue behavior by trusted mobile device applications, rogue behavior by untrusted mobile device applications, and other types of unwanted behavior can be detected.

The wireless network operator 404 can maintain a list of disapproved mobile device applications. As such, when the wireless network operator 404 identifies a rogue application (or otherwise determines that an application should be disqualified) at 420, the wireless network operator 404 can add the application identifier for the rogue application to the list of disapproved mobile device applications. The list can be stored in a secure manner, for example, to avoid tampering or malicious use. The list can be made accessible to other network operators or other types of entities. The list can include the application identifier for the disapproved mobile device applications, a version number, target user equipment or other identifying information. The wireless network operator 404 can maintain a list of approved mobile device applications. For example, the list can include all applications that are usable in a particular network, by a set of user equipment, and additional information.

At 422, the wireless terminal 402 sends a radio resource request to the wireless network. The wireless terminal 402 can transmit the radio resource request by any suitable technique. In some implementations, the radio resource request is transmitted on a random access channel (RACH). In some implementations, the radio resource request is transmitted on a physical uplink control channel (PUCCH), for example, to allow random access channels to be available for initial entry of wireless terminals.

The radio resource request includes the application identifier for the mobile device application that generated the request. The wireless terminal can be configured to send the application identifier number to the wireless network when the mobile device application first accesses the wireless network. The wireless terminal can be configured to send the application identifier number to the wireless network when the wireless terminal 402 downloads, installs, or executes the application.

The wireless terminal 402 can be configured to extract the application identifier for any mobile device application that attempts to communicate with the wireless network from the wireless terminal 402. In some cases, the wireless terminal 402 extracts the application identifier upon execution of the mobile device application on the wireless terminal. The wireless terminal 402 can be configured to send the application identifier in association with each radio resource request initiated by the mobile device application. The application identifier can be encoded in a random access channel, in a signaling channel used to transmit the radio resource request, or in a different signaling channel. The wireless network operator 404 accesses the radio resource request and the associated application identifier.

At 424, the wireless network operator 404 determines whether a disqualified mobile device application has initiated the radio resource request. For example, the wireless network operator 404 may compare the application identifier to a list of disqualified applications, the wireless network operator 404 may compare the application identifier to a list of permitted applications, or the wireless network operator 404 may use a different technique.

In cases where the wireless network operator 404 determines that the radio resource request was not initiated by a disqualified mobile device application, the wireless network operator 404 can approve the radio resource request. For example, at 426, the wireless network operator 404 can initiate a channel resource assignment to be sent to the wireless terminal 402. The wireless terminal 402 can use the channel resource assignment to communicate over the wireless network. For example, the wireless terminal 402 may use the channel resource assignment to access the Internet, to access data on a remote system, to send data to a remote system, etc.

In cases where the wireless network operator 404 determines that the radio resource request was initiated by a disqualified mobile device application, the wireless network operator 404 can deny the radio resource request and prevent the mobile device application from establishing a channel resource assignment. For example, at 430, the wireless network operator 404 can send a response to the wireless terminal 402 that denies the mobile device application access to wireless network resources.

In some instances, at 432, the wireless network operator 404 also sends the wireless terminal 402 a reason code indicating a reason that the mobile device application has been denied access to wireless network resources. The wireless terminal 402 can use the information received from the wireless network operator 404 to prevent the mobile device application from making further attempts to access the wireless network. For example, the wireless terminal 402 can permanently or temporarily disable the mobile device application.

The wireless network operator 404 can also inform the applications store 406 that the mobile device application has been denied access to wireless network resources. The applications store 406 can use the information received from the wireless network operator 404 to prevent future downloads of the mobile device application or to notify users of the mobile device application's disqualified status.

Figure 5:
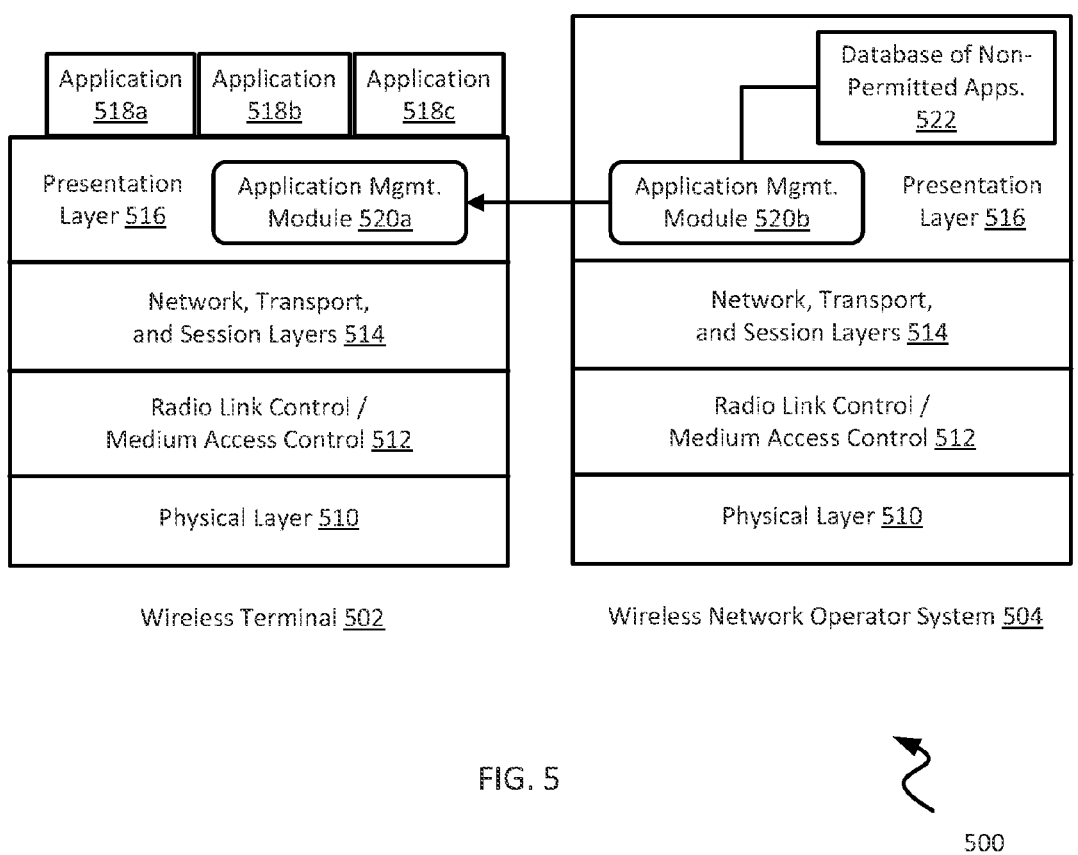
FIG. 5 is a schematic diagram showing an example system for managing mobile device applications.

FIG. 5 is a schematic diagram showing an example system 500 for managing mobile device applications. The example system 500 includes a wireless terminal 502 and a wireless network operator system 504. The system 500 can include additional or different devices, systems, and features, as appropriate. The system 500 can be configured to operate as shown in FIG. 5, or the system 500 can be configured to operate in a different manner.

The wireless network operator system 504 can access a database of disapproved applications 522. Alternatively or additionally, the wireless network operator system 504 may access a database of allowed applications. The database of disapproved applications 522 can be accessible to all wireless networks, or it can be privately maintained by the wireless network operator system 504. The wireless network operator system 504 can transmit a control message to the wireless terminal 502. The control message can include file or database of disapproved applications and can instruct the wireless terminal 502 to disable the disapproved applications. In some cases, the wireless network operator system 504 also sends to the wireless terminal 502 one or more public keys, and the wireless terminal 502 can authenticate the authentication control point that sends the control message. The wireless terminal 502 can disable mobile device applications that have been disallowed by the wireless network.

Additionally or alternatively, certain carriers may choose to disable certain mobile device applications in their network. For example, a carrier may choose to disable a mobile device application due to government regulations, to manage peak traffic demand, or in other circumstances. The wireless network can proactively disable the mobile device applications on multiple wireless terminals, for example, by transmitting a broadcast message with the list of disapproved mobile device applications to the wireless terminals within range of the wireless network. The wireless network can, in some instances, instruct wireless terminals to disable specific mobile device applications when the wireless terminals first establish connectivity with the wireless network. The wireless terminal 502 can temporarily disable specified mobile device applications when the wireless terminal 502 is notified by the wireless network to do so. Moreover, the wireless network can, in some instances, instruct wireless terminals to enable specific mobile device applications that were previously disabled. The wireless terminal 502 can re-enable specified applications, for example, when notified by the wireless network to do so or when it enters a new wireless network.

The wireless terminal 502 and the wireless network operator system 504 are configured to communicate by radio frequency transmission. In some instances, the wireless terminal 502 and the wireless network operator system 504 are configured to communicate based on additional or different types of wired or wireless communication links (e.g., using wired, infrared, optical, and other types of hardware). The wireless terminal 502 and the wireless network operator system 504 can communicate with each other directly or through intermediate systems, networks, or communication links. For example, wireless terminal 502 and the wireless network operator system 504 may communicate with each other through one or more routers, base stations, antennae, servers, or other types of communication systems.

The schematic diagram shown in FIG. 5 illustrates the protocol layers implemented by the wireless terminal 502 and the wireless network operator system 504. The protocol layers shown in FIG. 5 are provided as examples, and the examples shown can be modified, substituted, omitted, or otherwise reconfigured as appropriate. The wireless terminal 502 and the wireless network operator system 504 both include a physical layer 510, a radio link control/medium access control layer 512, one or more network, transport, and session layers 514, and a presentation layer 516. The wireless terminal 502 or the wireless network operator system 504 or both may include additional or different protocol layers.

The physical layer 510 can include hardware for wirelessly transmitting data. The physical layer 510 can be configured to transmit and receive radio frequency signals in any suitable frequency range. For example, the physical layer 510 may include a digital signal processor, a transceiver, filters, antennae, or any suitable combination of these and other components. The physical layer 510 may include additional or different features.

The radio link control/medium access control layer 512 is a data link layer that can provide communication between the physical layer 510 and one or more of the network, transport, and session layers 514. In some cases, the radio link control/medium access control layer 512 can be configured to perform error correction, concatenation, flow control, and other functions. The radio link control/medium access control layer 512 may be implemented in software that can be executed by data processing apparatus. The radio link control/medium access control layer 512 may include additional or different features.

The network, transport, and session layers 514 can provide communication between the radio link control/medium access control layer 512 and the presentation layer 516. The network, transport, and session layers 514 can be configured to establish and utilize connectivity, for example, with routers, nodes, hosts, and other control points in a wireless network. The network, transport, and session layers 514 may be implemented in software that can be executed by data processing apparatus. The network, transport, and session layers 514 may include additional or different features.

The presentation layer 516 can communicate with one or more of the network, transport, and session layers 514. The presentation layer 516 on the wireless terminal 502 may provide communication between applications (e.g., 518a, 518b, 518c) and a wireless network. The presentation layer 516 on the wireless network operator system 504 may provide communication between high-level network operator applications and the wireless network. The presentation layer 516 on the wireless terminal 502 or the presentation layer 516 on the wireless network operator system 504, or both, can include one or more features, modules, or components configured to control access to the wireless network by one or more mobile device applications. The presentation layer 516 of the wireless terminal 502 facilitates execution of the applications 518a, 518b, 518c. The presentation layer 516 of the wireless network operator system 504 includes, or has access to, a database of disapproved applications 522. The presentation layer 516 may include additional or different features.

The example presentation layers 516 shown in FIG. 5 include peer application management modules 520a and 520b; the presentation layer 516 of the wireless terminal 502 includes an application management module 520a, and the presentation layer 516 of the wireless network operator system 504 includes an application management module 520b. The application management modules 520a and 520b can be incorporated into communication systems using existing wireless communication protocols and standards. For example, the correspondence between the wireless terminal 502 and the wireless network operator system 504 can be executed at the physical layer using existing signaling standards. By incorporating an application management solution in the presentation layers 516, the solution can be compatible with any suitable communication protocol.

When a disapproved mobile device application is identified, the wireless network operator system 504 can send a list to the wireless terminal 502. The list can be sent from the application management module 520b to the application management module 520a at the presentation or application layer. The wireless network operator system 504 can also send the list to an applications store or to another subsystem or entity to disable future distribution of the mobile device applications on the list. The list can include one or more application identifiers, a reason code, authentication data, and additional information. The list can be sent with a control message that instructs the wireless terminal 502 to disable any mobile device applications identified in the list that are installed on the wireless terminal 502. The application management module 520a can then determine whether the wireless terminal 502 includes any mobile device application on the list and disable any such mobile device application. The application management module 520a can, in some cases, inform the user that the mobile device application has been disabled and may also inform the user of a reason. In this manner, or by using additional or different techniques, the application management module 520a can act as an application supervisor on the wireless terminal 502. The control message can be configured to disable a mobile device application on a granular level, for example, by disabling specific services or features of the mobile device application. For example, the control message can be configured to restrict the mobile device application's network access to WiFi only, Cellular only, no-GPS, security mode only (e.g., Transport Layer Security), or to apply other possible restrictions.

The wireless network operator system 504 uses a control point to send the list to the wireless terminal 502. The control point can be located in the network, application store or other logical location along a data path. The wireless terminal 502 can authenticate the control point. In some cases, the wireless terminal 502 implements policies that require authentication of the control point before any mobile device application can be disabled on the wireless terminal 502.

In some implementations, the control point maintains cryptographic certificates issued by a trusted code-signing authority. The trusted code-signing authority can issue a cryptographic certificate for each mobile device application. Each control point may also have a private key and a certificate from a trusted certificate authority to be recognized as an authorized control point for managing mobile device applications. The mobile terminal 502 can maintain a list of trusted certificate authorities.

When the control point issues a control message to disable a mobile device application, the control message can include the application identifier signed with the control point's private key. The control message can also include the control point's certificate from a trusted certificate authority. The wireless terminal 502 can authenticate the control point by verifying that the signature on the control point's certificate was issued from a trusted certificate authority recognized by the mobile terminal 502. The wireless terminal 502 can authenticate the control point by verifying the signature on the control message using the public key in the certificate. If the wireless terminal 502 verifies the signature on the control message and verifies the application identifier in the disable command matches the application identifier extracted from the signed mobile device application (or the certificate for the mobile device application), then the mobile can disable the mobile device application.

The authentication process can use any suitable techniques or protocols, as appropriate. In some cases, hash values for mobile device applications can be maintained (e.g., stored) on the wireless terminal 502 in association with the corresponding application identifier. During a request to run the application on a network provider's network, the wireless terminal 502 can forward the application identifier and associated hash value to the wireless network operator, where an associated signature could be verified. In some implementations, the wireless network operator can generate and store hash values associated with authorized mobile device applications that are approved by the wireless network. The hash values can be generated on demand, for example, in response to requests to run a mobile device application on the wireless network from the wireless terminal 502. In some instances, the database of stored hash values can be updated opportunistically, for example, when processing resources become available (e.g., instead of or in addition to on demand).

The wireless terminal 502 can use any suitable technique to disable a disapproved mobile device application. In some implementations, the application management module 520a can disable a mobile device application such that the mobile device application can no longer be executed on the wireless terminal 502. As such, the user may have no further access to the application. In some implementations, the application management module 520a can delete the mobile device application and its application data. In some implementations, the application management module 520a can disable a mobile device application such that the mobile device application be executed on the wireless terminal 502 but cannot use functions of the mobile device application that utilize wireless network resources. For example, when a disapproved mobile device application attempts to establish a communication channel on the wireless network, before the wireless access request is sent to the physical layer 510, the application management module 520a can perform a table lookup to check if the mobile device application is barred from the particular wireless network. If the mobile device application has been disapproved by the wireless network, the application management module 520a can terminate the request. As such, the application management module 520a can prevent the request from being transmitted to the wireless network operator system 504 in some instances. Table 1 is an example table that can be used to disable network access by a disapproved mobile device application.

TABLE 1

| Wireless Network | Permanently Disabled Apps | Temporarily Disabled Apps |
|---|---|---|
| LTE | X1234 | A9999 |
| WiMAX | — | — |
| WiFi | — | Y4567 |
| GSM | X1234; A9999 | — |

The left column of Table 1 shows examples of wireless networks that can be accessed by the wireless terminal 502. The example wireless networks shown are LTE, WiMAX, WiFi, and GSM. Additional or different types of wireless networks can be identified in the table. The wireless networks can be identified by the type of network (e.g., LTE, WiFi, etc.), the name of the service provider (e.g., AT&T, Sprint, Verizon, etc.), the location of the wireless network (e.g., home, work, café, etc.), or in a different manner.

The center column of Table 1 shows application identifiers for mobile device applications that are permanently disabled. The right column of Table 1 shows application identifiers for mobile device applications that are temporarily disabled. More generally, a table may include additional or different information. For example, the table can indicate a time period for which each temporarily disabled mobile device application is disabled, or the table can indicate a location where each disabled mobile device application is disabled.

In an example case, suppose the mobile device application associated with application identifier "X1234" attempts to access the LTE wireless network. In this case, the application management module 520a performs a table lookup and finds that "X1234" is a disabled mobile device application. The application management module 520a can then prevent the mobile device application from establishing a communication channel on the LTE network. As such, the instance of the mobile device application installed on the wireless terminal 502 can no longer access the LTE network. Consequently, the mobile device application can no longer send messages to the network. In some cases, this can prevent or reduce the likelihood of a denial of service attack on the random access channel (RACH). As shown in Table 1, it is possible that same mobile device application (X1234) is not denied access to other networks (e.g., WiFi), and therefore can still establish a communication channel on such other networks.

Figure 6:
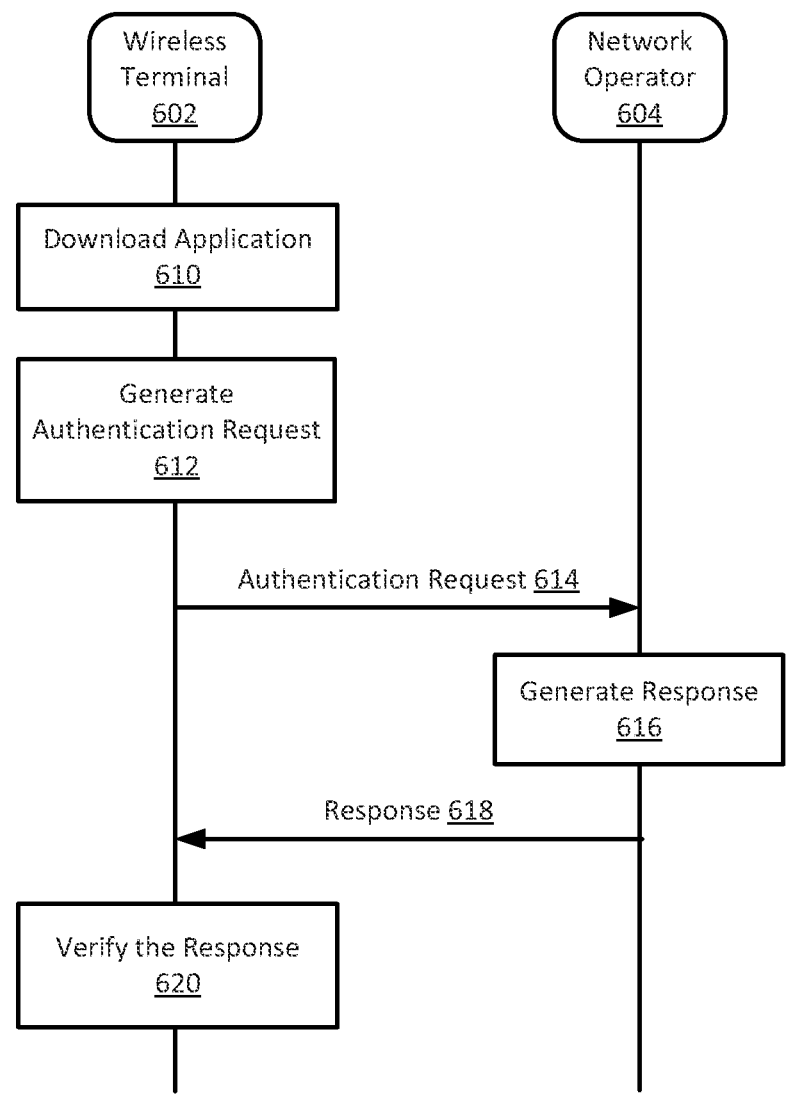
FIG. 6 is a signaling and flow diagram showing another example technique for managing mobile device applications.

FIG. 6 is a signaling and flow diagram showing another example process 600 for managing mobile device applications. The example process 600 shown in FIG. 6 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 6 can be executed as multiple separate operations, or one or more subsets of the operations shown in FIG. 6 can be combined and executed as a single operation.

The process 600 can be implemented in a communication system. For example, the process 600 can be implemented by one or more components of the communication system 100 shown in FIG. 1 or by a different type of system. FIG. 6 shows certain operations being performed by a wireless terminal 602 and a wireless network operator 604. In some implementations of the process 600, one or more of the operations shown in FIG. 6 can be performed by additional or different components, devices, or subsystems, or by combinations of them.

At 610, the wireless terminal 602 downloads a mobile device application. The mobile device application can be downloaded during manufacturing or provisioning of the wireless terminal, during operation of the wireless terminal, or at another time. The mobile device application can be downloaded over a wireless network, over a wired connection, or over another type of communication link. In some implementations, the mobile device application is downloaded from an applications store, or the mobile device application can be downloaded from another source.

The downloaded information can include application code for the mobile device application, application data for the mobile device application, and other information that defines the operation of the mobile device application. The downloaded information can include an application identifier for the mobile device application, a digital signature for the mobile device application, a cryptographic certificate for the mobile device application, or any suitable combination of these and other data. In some cases, the wireless terminal verifies the digital signature based on a digital signature scheme.

In some cases, the wireless terminal corresponds with a wireless network operator to determine whether the mobile device application is permitted to access the wireless network. For example, the wireless terminal can delay or cancel installation of the mobile device application if the mobile device application is disapproved for use in the wireless network. The wireless terminal can correspond with the wireless network operator to authenticate the mobile device application at one or more times before or after installation of the mobile device application on the wireless terminal. In some instances, the wireless terminal can be configured to communicate with the wireless network operator system to authenticate the mobile device application prior to or upon installing the mobile device application, prior to or upon executing the mobile device application, in response to the wireless terminal powering on, in response to identifying that the mobile device application has not been authenticated, or at a combination of these or other times.

At 612, the wireless terminal 602 generates an authentication request. The authentication request can include the application identifier or other suitable information identifying the mobile device application. In some implementations, the authentication request includes a challenge value. The authentication request can also include information from the cryptographic certificate associated with the mobile device application, such as, for example, a public key value. The authentication request can include additional or different information, as appropriate.

At 614, the wireless terminal 602 sends the authentication request to the wireless network operator 604. For example, the wireless terminal can send the authentication request over the wireless network, or by a different type of communication link. The wireless network operator system receives the authentication request. The authentication request can be routed to or handled by the appropriate entity or control point on the wireless network operator system.

At 616, the wireless network operator 604 generates a response. For example, a response to the authentication request can be generated by a certificate authority, an applications manager system, or by any suitable combination of these and other components or subsystems on the wireless network operator system. In some implementations, the authentication request includes the application identifier corresponding to a particular mobile device application, and to generate the response, the wireless network operator can access private data associated with the corresponding mobile device application. For example, in some cases the wireless network operator has a private key value associated with each mobile device application. In some implementations, the authentication request include a public key value from a cryptographic certificate, and to generate the response, the wireless network operator can access the private key value associated with the cryptographic certificate.

The wireless network operator and the wireless terminal can use a pre-established authentication protocol, which may include one or more pre-established parameters or values. Any suitable authentication technique may be used. For example, the wireless network operator may generate the response based on a cryptographic challenge-response authentication protocol or another type of technique. In some cryptographic challenge-response authentication techniques, the authenticator receives a challenge value and generates a response value based on the challenge value and private data. For example, the response can be a digital signature on the challenge value. The digital signature can be generated using a private key value (or another type of private data) according to any suitable digital signature scheme. As another example, the response can be a message authentication code on the challenge value. The message authentication code can be generated using a private key value (or another type of private data) according to a keyed hash-based message authentication code or any other suitable cryptographic technique. In some instances, the private key used to generate the response corresponds to a public key that is certified by a cryptographic certificate. Additional or different techniques may be used.

At 618, the wireless network operator 604 sends the response to the wireless terminal 602. For example, the wireless network operator can send the authentication request over the wireless network, or by a different type of communication link. To initiate transmission of the response, the response can be routed to or handled by the appropriate entity or control point on the wireless network operator system. The wireless terminal system receives the response. In some instances, the response includes a proffered response value, or the response may include or different types of information.

At 620, the wireless terminal 602 verifies the response. The wireless terminal can verify the response based on the proffered response value, the cryptographic certificate, the public key value, or any suitable combination of these and other data. Verifying the proffered response value determines whether the proffered response value was properly generated according to the challenge-response protocol based on the challenge value and the correct private key value.

The proffered response value can be verified by any suitable technique. The response can be verified based on the pre-established authentication technique, and corresponding system parameters, as appropriate. For example, in cases where the wireless network operator system is configured to generate a proffered response according to a digital signature algorithm, the wireless terminal can use a signature verification technique to verify the proffered response. As another example, in cases where the wireless network operator system is configured to generate a proffered response based on a keyed hash-based message authentication code, the wireless terminal can use an appropriate HMAC verification technique to verify the proffered response. Additional or different techniques may be used.

If the wireless terminal verifies the response and determines that the proffered response is the correct response, the mobile device application has been authenticated. In such cases, the wireless terminal can install the mobile device application, execute the mobile device application, restore the mobile device application, or perform any other suitable action in response to authenticating the mobile device application. The fact that the mobile device application has been authenticated may allow the wireless terminal to trust the mobile device application or to execute the mobile device application in a trusted mode of operation. The mobile device application can be re-authenticated, for example, periodically, upon startup of the wireless terminal, upon entering range of a new wireless network, or based on additional or different conditions.

If the wireless terminal verifies the response and determines that the proffered response is not the correct response, the mobile device application has not been authenticated. In such cases, the wireless terminal can delete the mobile device application, disable the mobile device application, re-attempt the authentication, or perform any other suitable action in response to determining that the mobile device application has not been authenticated. The fact that the mobile device application has been authenticated may prevent the wireless terminal from trusting the mobile device application or from executing the mobile device application in a trusted mode of operation.

Figure 7:
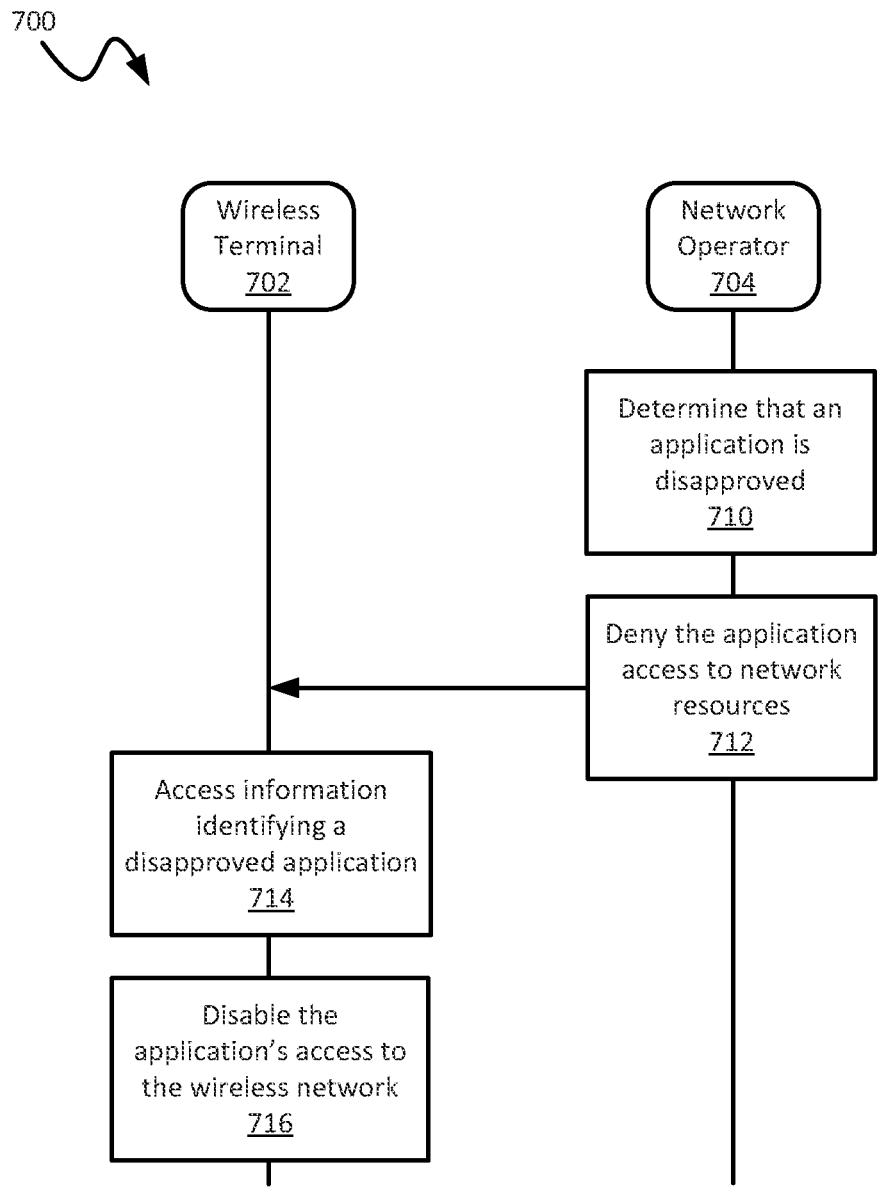
FIG. 7 is a signaling and flow diagram showing another example technique for managing mobile device applications.

FIG. 7 is a signaling and flow diagram showing another example technique for managing mobile device applications. The example process 700 shown in FIG. 7 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 7 can be executed as multiple separate operations, or one or more subsets of the operations shown in FIG. 7 can be combined and executed as a single operation.

The process 700 can be implemented in a communication system. For example, the process 700 can be implemented by one or more components of the communication system 100 shown in FIG. 1 or by a different type of system. FIG. 7 shows certain operations being performed by a wireless terminal 702 and a wireless network operator 704. In some implementations of the process 700, one or more of the operations shown in FIG. 7 can be performed by additional or different components, devices, or subsystems, or by combinations of them.

At 710, the wireless network operator 704 determines that a mobile device application is disapproved. For example, the wireless network operator can determine that the mobile device application is disapproved for use in the wireless network at certain times, at all times, in certain geographic locations, in all geographic locations, or for other types of conditions.

Any suitable technique can be used to determine that the mobile device application is disapproved. In some implementations, the mobile device application is disapproved based on network usage data. The wireless network operator can access network usage data that identify wireless network resources accessed by the mobile device application. For example, the network usage data can include information regarding radio resource requests that were initiated by the mobile device application, information regarding data channels used by the mobile device application, and other information. In some implementations, the network usage data indicates a number of times the mobile device application has requested assignment of network resources over a given time period. The network usage data can be based on actual usage, or actual attempted usage, of the wireless network by the mobile device application. For example, the network usage data can include information obtained by monitoring network usage by the mobile device application.

In some implementations, the network usage data are used to compare the wireless network resources accessed by the mobile device application with a network usage map for the mobile device application. The mobile device application can be disapproved based on the comparison between the actual usage (e.g., as indicated by the network usage data), and the approved usage (e.g., as indicated by the network usage map). The network usage map can include any information that indicates expected, approved, or planned network usage by a mobile device application. For example, the network usage map can include information regarding how often the mobile device application would typically initiate a radio resource requests, how much data the mobile device application would typically transfer to or from a remote server, and other information. In some implementations, the network usage map indicates threshold values, such as, for example, a maximum number of times the mobile device application is permitted to request assignment of network resources over a given time period, a maximum amount of data the mobile device application is permitted to transfer over a given time period, etc.

The network usage map can be generated by testing, evaluating, or otherwise analyzing the mobile device application. In some examples, performance characteristics of mobile device applications are tested or evaluated in order to estimate an amount of network resources the mobile device application will consume during normal or expected operation. For example, a mobile device application can be analyzed to estimate how frequently it will initiate communication on the wireless network. The network usage map can be generated prior to actual use of the mobile device application in the wireless network, or the network usage map can be generated, updated, or otherwise modified at different or additional times. In some cases, a wireless network operator can approve or disapprove a mobile device application based on the network usage map generated for the mobile device application. A mobile device application can be disapproved, for example, if the network usage map indicates that the mobile device application exhibits behavior that is likely to create a denial of service attack or otherwise degrade performance of the wireless network.

At 712, the wireless network operator 704 denies the mobile device application access to network resources. The wireless network operator can use any suitable technique to deny network resources to the mobile device application. In some instances, two types of techniques can be used. According to the first technique, the wireless network operator denies resources to the mobile device application each time the resources are requested by the mobile device application. According to the second technique, the wireless network operator preemptively denies network resources to the mobile device application by instructing the wireless terminal 702 to disable the mobile device application's ability to request network resources. These two example techniques can be modified, combined with each other, substituted for other techniques, or combined with and additional or different techniques. In some implementations, after denying the mobile device application access to the wireless network for an initial time period, the wireless network operator may determine that the mobile device application is approved for use during another time period and grant the mobile device application access to the wireless network during the other time period.

In some instances, according to the first example technique for denying the mobile device application access, the wireless network operator receives from the wireless terminal a request for an assignment of wireless network resources. The request can be a radio resource request sent by the wireless terminal on a random access channel. The request can include an application identifier for the mobile device application, as well as additional information. The application identifier can be embedded in the same random access channel or a different channel. For example, the request can be sent on a first signaling channel, and the application identifier can be sent on a second signaling channel. The request can include additional or different information, which can be sent to the wireless network operator in the same or a different manner.

In response to receiving the request for an assignment of wireless network resources, the wireless network operator can deny the wireless terminal the assignment of wireless network resources by any suitable technique. The wireless network operator can send the wireless terminal a message indicating that the wireless terminal has been denied the assignment of wireless network resources. The wireless network operator can send the wireless terminal a message indicating a reason that the wireless terminal has been denied the assignment of wireless network resources. The wireless terminal can, in some implementations, display a message notifying a user of the reason. In some cases, for example when the mobile device application has been temporarily disapproved, a subsequent request initiated by the mobile device application at a different time or in a different location may be approved by the wireless network operator.

In some instances, according to the second example technique for denying the mobile device application access, the wireless network operator sends the wireless terminal information indicating that the mobile device application is disapproved for use in the wireless network. For example, the wireless network operator can access a database identifying disapproved mobile device applications and send a list of the disapproved mobile device applications to the wireless terminal.

In some implementations, when the wireless terminal receives instructions to disable a mobile device application, the wireless terminal can authenticate the wireless network control point that transmitted the instructions. As such, in response to the instructions, the wireless network operator can receive an authentication request from the wireless terminal. When the wireless network operator receives an authentication request, it can generate a proffered response and initiate transmission of the proffered response to the wireless terminal In some implementations, the wireless network operator can deny the mobile device application access to network resources using additional or different techniques. For example, the wireless network operator can notifying an applications store that the mobile device application is denied access to the wireless network. In response to receiving the notification, the applications store can prevent further distribution of the mobile device application or take other action, as appropriate. As another example, the wireless network operator can broadcasting a message that includes a list of disapproved mobile device applications. The message can be broadcast, for example, to all wireless terminals within range of the wireless network. The broadcast message can indicate that radio resource requests initiated by the mobile device applications on the list will be denied; or the broadcast message can indicate that the mobile device applications on the list should be disabled. The broadcast message can include additional or different information or instructions, as appropriate.

At 714, the wireless terminal 702 accesses information identifying a disapproved mobile device application. The information can be received in any suitable format, at any suitable time, by any suitable means. In some cases, the information is received at the wireless terminal during manufacturing of the wireless terminal, during provisioning of the wireless terminal, during use of the wireless terminal, or at another time. The information can be received at the wireless terminal over the wireless network or by another communication link.

In some instances, the information is received in response to a request for an assignment of network resources. For example, the information can be received in response to a radio resource request initiated by the disapproved mobile device application, and the information can indicate that the radio resource request has been denied by the wireless network operator. In some instances, the information is received upon entering a range of the wireless network, upon powering on of the wireless terminal, or in response to another event or condition. The information can identify a single disapproved mobile device application, or the information can identify multiple disapproved mobile device applications. For example, the information can include a list of disapproved mobile device applications.

At 716, the wireless terminal 702 disables the mobile device application's access to the wireless network. In some instances, the mobile device application's access is disabled in response to the information received from the wireless network operator 704. The mobile device application's access to the wireless network can disabled on the wireless terminal in response to the wireless network denying a radio resource request initiated by the mobile device application on the wireless terminal. For example, the wireless terminal may receive a message indicating that the radio resource request was denied because the mobile device application has been disapproved. A particular mobile device application's access to the wireless network can disabled on the wireless terminal in response receiving from the wireless network a list of disapproved mobile device applications, and identifying that the list includes the particular mobile device application. The mobile device application's access can be disabled in response to other events or conditions.

The mobile device application's access to the wireless network can be disabled on the wireless terminal by any suitable technique. In some cases, the mobile device application's access is disabled by disabling the mobile device application on the wireless terminal, by disabling user access to the mobile device application on the wireless terminal, by disabling execution of the mobile device application on the wireless terminal, or by any suitable combination of these and other techniques.

In some implementations, the mobile device application's access to the wireless network is disabled on the wireless terminal by updating a lookup table on the wireless terminal and using the lookup table to filter requests for network resources generated by mobile device applications on the wireless terminal. For example, filtering the requests generated by mobile device applications on the wireless terminal can include comparing each request to the lookup table to determine whether the request was generated by a disapproved mobile device application. The lookup table can identify permanently disabled mobile device applications, temporarily disabled mobile device applications, or any suitable combination.

Operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In some aspects, a list of mobile device applications that are disapproved for use on a wireless network is accessed. The mobile device applications are prevented from establishing a communication link on the wireless network.

Implementations of these and other aspects may include one or more of the following features. The list is accessed at a wireless network operator system in response to receiving a request for an assignment of a wireless network resource. Preventing the mobile device applications from establishing a communication link includes denying the assignment of the wireless network resources. Preventing the mobile device applications from establishing a communication link includes broadcasting the list to mobile devices within range of the wireless network.

Additionally or alternatively, implementations of these and other aspects may include one or more of the following features. The list is accessed at a mobile device. Preventing the mobile device applications from establishing a communication link includes disabling one or more of the mobile device applications at the mobile device. The list identifies a plurality of permanently disapproved mobile device applications and a plurality of temporarily disapproved mobile device applications.

In some aspects, it is determined that a mobile device application is disapproved for use on a wireless network. The mobile device application is then denied access to the wireless network.

Implementations of these and other aspects may include one or more of the following features. Denying the mobile device application access includes receiving, from a mobile device, a request for an assignment of wireless network resources. The request includes an application identifier for the mobile device application. The mobile device is denied the assignment of wireless network resources in response to receiving the request. A message is sent to the mobile device. The message indicates that the mobile device has been denied the assignment of wireless network resources. The message indicates a reason that the mobile device has been denied the assignment of wireless network resources.

Additionally or alternatively, implementations of these and other aspects may include one or more of the following features. Determining that the mobile device application is disapproved for use on a wireless network includes accessing network usage data that identify wireless network resources accessed by the mobile device application. Determining that the mobile device application is disapproved for use on a wireless network includes comparing the wireless network resources accessed by the mobile device application to a network usage map for the mobile device application. The mobile device application is disapproved based on the comparison. Determining that the mobile device application is disapproved for use on a wireless network includes testing a performance characteristic of the mobile device application. The mobile device application is disapproved based on the testing. Determining that the mobile device application is disapproved for use on a wireless network includes determining that the mobile device application exhibits characteristics that degrade performance of the wireless network. Determining that the mobile device application is disapproved for use on a wireless network includes determining that the mobile device application is disapproved for use during a time period. The mobile device application is denied access to the wireless network during the time period.

Additionally or alternatively, implementations of these and other aspects may include one or more of the following features. Denying the mobile device application access includes sending, to a mobile device, information indicating that the mobile device application is disapproved for use in the wireless network. A database identifying multiple disapproved mobile device applications is accessed. The information is sent to the mobile device in a message that includes a list of the disapproved mobile device applications.

In some aspects, an authentication request is received at a wireless network operator system. The authentication request is received from a mobile device, and the authentication request includes an application identifier for a mobile device application. Private data associated with the mobile device application are accessed at the wireless network operator system. A response is generated based on the private data and the authentication request. Transmission of the response to the mobile device is initiated.

Implementations of these and other aspects may include one or more of the following features. The authentication request includes a challenge value. The response is generated based on the challenge value. The authentication request is received from a mobile device over a wireless network operated by the wireless network operator. The response is transmitted to the mobile device over the wireless network. The private data includes a private key value. The response is generated according to a cryptographic challenge-response protocol. The response includes a public key value associated with the mobile device application. The private key value corresponds to the public key value.

Additionally or alternatively, implementations of these and other aspects may include one or more of the following features. Prior to receiving the authentication request, the mobile device application is accessed at the wireless network operator system. A digital signature is generated based on the mobile device application and the private data. Prior to receiving the authentication request a digital certificate that includes the application identifier is generated.

In some aspects, information is received at a mobile device. The information identifies a mobile device application and indicates that the mobile device application is disapproved for use in a wireless network. The information is received from a wireless network operator system associated with the wireless network. Access to the wireless network by the mobile device application is disabled at the mobile device.

Implementations of these and other aspects may include one or more of the following features. The information is received from the wireless network in response to a request for an assignment of wireless network resources. The information indicates that the mobile device is denied the assignment of the wireless network resources. The request is generated at the mobile device. The request is sent to the wireless network operator system. An application identifier for the mobile device application is sent to the wireless network operator system. The application identifier is sent in association with the request. The application identifier is sent by embedding a code in a random access channel. The request and the application identifier are sent over a single signaling channel. The request is sent over a first signaling channel, and the application identifier is sent over a second signaling channel.

Additionally or alternatively, implementations of these and other aspects may include one or more of the following features. The information includes a list of disapproved mobile device applications. Disabling access to the wireless network by the mobile device application includes disabling the mobile device application on the mobile device. The mobile device includes an application management module that accesses the list and disables the mobile device application. The application management module is configured to operate in a presentation layer of the mobile device. Disabling the mobile device application includes disabling user access to the mobile device application on the mobile device. Disabling the mobile device application includes disabling execution of the mobile device application on the mobile device. Disabling the mobile device application includes updating a lookup table on the mobile device based on the list and using the lookup table to filter requests for network resources generated by mobile device applications at the mobile device. Filtering the requests includes comparing each request to information in the lookup table to determine whether the request was generated by a disapproved mobile device application.

In some aspects, An application identifier for a mobile device application is accessed at a mobile device. The mobile device communicates with a wireless network operator system to authenticate the mobile device application based on the application identifier.

Implementations of these and other aspects may include one or more of the following features. Communicating with the wireless network operator system to authenticate the mobile device application includes sending an authentication request to the wireless network operator system. The authentication request includes the application identifier and a challenge value. A proffered response is received from the wireless network operator system. The proffered response is verified at the mobile device according to a cryptographic challenge-response protocol. A digital certificate associated with the mobile device application is received. A digital signature associated with the mobile device application is received. The mobile device application is verified based on the digital signature and the digital certificate. Communicating with the wireless network operator system includes corresponding with a certificate authority.

Additionally or alternatively, implementations of these and other aspects may include one or more of the following features. The mobile device communicates with the wireless network operator system to authenticate the mobile device application prior to executing the mobile device application at the mobile device. The mobile device communicates with the wireless network operator system to authenticate the mobile device application prior to installing the mobile device application at the mobile device. The mobile device communicates with the wireless network operator system to authenticate the mobile device application after installing the mobile device application at the mobile device and prior to first use of the installed mobile device application. The mobile device communicates with the wireless network operator system to authenticate the mobile device application in response to the mobile device powering on.

In some aspects, information is received at a mobile device. The information is provided to the mobile device over a wireless network by a wireless network operator system associated with the wireless network. The mobile device authenticates the wireless network operator system based on the information.

Implementations of these and other aspects may include one or more of the following features. The information includes a list of mobile device applications that are disapproved for use in the wireless network. One or more of the mobile device applications is disabled in response to authenticating the wireless network operator system. Disabling the mobile device application includes disabling user access to the mobile device application on the mobile device or disabling execution of the mobile device application on the mobile device. Authenticating the wireless network operator system includes sending an authentication message to the wireless network operator system and receiving a response from the wireless network operator system. The authentication message includes a challenge value. The response includes a proffered response value. Authenticating the wireless network operator system further includes verifying the proffered response value at the mobile device. The information includes a public key value. The response is verified based on the public key value according to a cryptographic challenge-response protocol.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for managing mobile device applications, the method comprising:
    accessing a list that identifies mobile device applications that are disapproved by an operator of a wireless network for use on the wireless network; and
    by operation of data processing apparatus, preventing the mobile device applications that are identified in the list from establishing a communication link on the wireless network.

2. The method of claim 1, wherein the list is accessed at a wireless network operator system in response to receiving a request for an assignment of wireless network resources, and preventing the mobile device applications from establishing a communication link includes denying the assignment of the wireless network resources.

3. The method of claim 1, wherein preventing the mobile device applications from establishing a communication link includes broadcasting the list to mobile devices within range of the wireless network.

4. The method of claim 1, wherein the list is accessed at a mobile device, and preventing the mobile device applications from establishing a communication link includes disabling one or more of the mobile device applications at the mobile device.

5. The method of claim 1, wherein the list identifies a plurality of permanently disapproved mobile device applications and a plurality of temporarily disapproved mobile device applications.

6. The method of claim 1, wherein the mobile device applications that are identified in the list are prevented from establishing a communication link on the wireless network while other mobile device applications are permitted to establish a communication link on the wireless network.

7. The method of claim 1, wherein list identifies mobile device applications that the operator of the wireless network has designated as rogue mobile device applications.

8. A communication system comprising:
    a computer-readable medium operable to store a list that identifies mobile device applications that are disapproved by an operator of a wireless network for use on the wireless network; and
    data processing apparatus operable to prevent the mobile device applications that are identified in the list from establishing a communication link on the wireless network.

9. The communication system of claim 8, further comprising the wireless network, wherein the wireless network includes a cellular telecommunication network.

10. The communication system of claim 8, further comprising a mobile device that includes the computer-readable medium and the data processing apparatus.

11. The communication system of claim 10, wherein the list is accessed at the mobile device, and preventing the mobile device applications from establishing a communication link includes disabling one or more of the mobile device applications at the mobile device.

12. The communication system of claim 8, further comprising a computing system of a wireless network operator, wherein the computing system includes the computer-readable medium and the data processing apparatus.

13. The communication system of claim 12, wherein the list is accessed at the computing system of the wireless network operator in response to receiving a request for an assignment of wireless network resources, and the preventing the mobile device applications from establishing a communication link includes denying the assignment of the wireless network resources.

14. A computer-readable medium storing instructions that are operable when executed by data processing apparatus to perform operations for managing mobile device applications, the operations comprising:

accessing a list that identifies mobile device applications that are disapproved by an operator of a wireless network for use on the wireless network; and preventing the mobile device applications that are identified in the list from establishing a communication link on the wireless network.

15. The computer-readable medium of claim 14, wherein the list is accessed at a wireless network operator system in response to receiving a request for an assignment of wireless network resources, and preventing the mobile device applications from establishing a communication link includes denying the assignment of the wireless network resources.

16. The computer-readable medium of claim 14, wherein the list is accessed at a mobile device, and preventing the mobile device applications from establishing a communication link includes disabling one or more of the mobile device applications at the mobile device.

17. The computer-readable medium of claim 16, wherein disabling one or more of the mobile device applications includes disabling user access to the one or more mobile device applications on the mobile device.

18. The computer-readable medium of claim 16, wherein disabling one or more of the mobile device applications includes disabling execution of the one or more mobile device applications on the mobile device.

19. The computer-readable medium of claim 16, wherein disabling one or more of the mobile device applications includes filtering requests for wireless network resources generated at the mobile device by the one or more mobile device applications on the mobile device.

* * * * *